United States Patent [19]
Tomlinson, Jr.

[11] Patent Number: 4,893,255
[45] Date of Patent: Jan. 9, 1990

[54] SPIKE TRANSMISSION FOR NEURAL NETWORKS

[75] Inventor: Max S. Tomlinson, Jr., San Diego, Calif.

[73] Assignee: Analog Intelligence Corp., Carlsbad, Calif.

[21] Appl. No.: 200,604

[22] Filed: May 31, 1988

[51] Int. Cl.$^4$ .................. G06F 15/18; G06G 7/12
[52] U.S. Cl. ..................... 364/513; 364/200; 364/274.9; 364/276.6; 364/807
[58] Field of Search ........... 364/513, 200, 800, 807; 382/14, 15

[56] References Cited

U.S. PATENT DOCUMENTS

| | | | |
|---|---|---|---|
| 3,950,733 | 4/1976 | Cooper et al. | 364/513 |
| 4,660,166 | 4/1987 | Hopfield | 364/807 |
| 4,774,677 | 9/1988 | Buckley | 364/513 |
| 4,802,103 | 1/1989 | Faggin et al. | 364/513 |
| 4,809,193 | 2/1989 | Jourjine | 364/200 |

Primary Examiner—John R. Lastova
Attorney, Agent, or Firm—Calif Kip Tervo

[57] ABSTRACT

Pulse trains are utilized for the transmission of information in a neural network. A squash function is achieved by logically OR'ing together pulsed outputs, giving f(x) approximately $1-e^{-x}$. For Back Propagation, as derived by Rumelhart, the derivative of the squash function is available by examining the time when no OR'ed together pulses are present, being $1-f(x)$, or $e^{-x}$. Logically AND'ing of the two signals. Mulitplication of input frequencies by weights is accomplished by modulating the width of the output pulses, while keeping the frequency the same.

21 Claims, 7 Drawing Sheets

SPIKE TRANSMISSION FOR NEURAL NETWORKS

BACKGROUND OF THE INVENTION

I. Field of Invention

This invention relates in general to an improved method of performing Back Propagation in the training of Neural Networks, and more specifically to a method utilizing pulse trains as the information transmittion mechanism within a Neural Network.

II. Background Art

As used herein, a neural network performs a mapping from input data to output data, i.e.: it receives a set of inputs, in some form, from an external source and from them produces a set of outputs, in some form. A normal computer is a typical device which performs just such a function. A Back Propagation Neural Network is supposed to *learn* or *adapt* to perform the mapping by being given stereotypical examples of what it is supposed to do. This is in constrast to a normal computer which must be told how to perform a mapping function.

Implementing Neural Networks in Integrated Circuits (IC) is desirable.

One of the major difficulties in implementing a neural network on an IC is that, in the theoretical ideal, a neural network is inherently an analog process which necessitates a great number of analog components, including analog multipliers. Conventional Neural Networks, and Back Propagation Neural Networks in particular, which use analog methods, are quite sensitive to Offset Errors. Offset Errors are a particular king of inaccuracy inherent in analog multipliers (and analog amplifiers in general). Analog multipliers, instead of giving the desired $Z = A \times B$, give instead $Z = (A + \text{Offset}_A) \times (B + \text{Offset}_B) + \text{Offset}_Z$. Because of the offset errors, a Network often is unable to converge to a reasonable answer, and therefore cannot learn to perform the desired mapping function.

Also, the Back Propagation algorithm utilizes an almost arbitrary, nonlinear function and its derivative. These two functions must be farily accurate, lest the algorithm is not able to learn. Implementing these two functions with the required accuracy can be difficult.

This invention discloses a family of physical devices that overcome these problems.

Original theoretical approaches towards neural networks are based upon the idea that when two neurons in the brain are active there is a correlation between them. One early rule developed by D. O. Hebb is described in his book "The Organization of Behaviour", Wiley, 1949. The Hebbian rule states that when two neurons are firing simultaneously an association link between them is strengthened. Accordingly, the next time either of the two neurons fires, the other one is more probable to fire also. However, the Hebbian rule is not a sufficient model to explain the learning process. Under the Hebbian rule, the connection strengths between neurons grow without bound. If maximums are placed on the connection strengths, these maximums are always reached.

Subsequently, the Perceptron Model was developed by Frank Rosenblatt, and is discussed in his book "Principles of Neurodynamics", Spartan, 1962. The Perceptron Model was originally believed powerful enough to enable a machine to learn in a human-like manner.

The Perceptron Model includes input, hidden and output layers; each comprised of one or more processing elements. In response to input stimuli, the input layer provides information to the hidden layer. Similarly, the hidden layer provides information to the output layer. Connections between the input and hidden processing elements are fixed; connections between the hidden and output processing elements are adjustable.

In the Perceptron Model, if the inputs are boolean (i.e. either zero or one), then the intended purpose of the hidden layer is to extract some kind of features from the input data. However, if the inputs to the Model are continuous numbers (i.e. having more than two distinct values, rather than just two boolean values), then the hidden layer is not used. Instead, the outputs of the input layer are connected directly to the inputs of the output layer.

In the Perceptron Model, all learning takes place in the output layer. Under the Perceptron Model many problems have been experimentally and mathematically shown to be representable by connection strengths between layers. Rosenblatt's Perceptron Learning Algorithm enables a neural network to find a solution if there exists a representation for that problem by some set of connection strengths. Rosenblatt's Perceptron Convergence Proof is a well known mathematical proof that a Perceptron System will find a solution if it exists.

In operation, the Perceptron Model modifies the strengths of the weighted connections between the processing elements, to learn an appropriate output response corresponding to a particular input stimulus vector. The modification of the connection weights occurs when an incorrect output response is given. This modification of the weights changes the transfer of information from the input to output processing elements so that eventually the appropriate output response will be provided. However, through experimentation, it was discovered that the Perceptron Model was unable to learn all possible functions. It was hoped that these unlearnable functions were only pathological cases, analogous to certain problems that humans cannot solve. This is not the case. Perceptron Systems cannot represent and learn some very simple problems that humans are able to learn and represent.

An example of a problem that the Perceptron Model is unable to represent (without $2^N$ hidden processing elements, where N is the number of input nodes), and therefore cannot learn, is the parity or "exclusive-or" boolean function. To perform such a problem (with fewer than $2^N$ hidden processing elements) a system would require two layers of modifiable weights. The Perceptron System cannot properly adjust more than one layer of modifiable weights. It was speculated that no learning mechanism for a system with multiple layers of modifiable weights would ever be discovered because none existed (Minsky & Papert, 1969, in "Perceptrons").

(The problem with using $2^N$ hidden units is three-fold. First, since the hidden units, in the Perceptron Model, do not adapt, all the units must be present, regardless of the function which needs to be learned, so that all functions can be learned. Second, the number of units required grows phenomenally; for example, $2^{34}$ is approximately 17 billion, more neurons than in a human brain; this means that the largest parity problem the human brain could solve, if wired in this manner, would have at most 32 inputs. Third, the system would not generalize; given two input/output vector pairs near one another, one trained and the other not, the system should be able to interpolate the answer from the first; with a large number of hidden units, it has been experimentally shown that this is not the case.)

Almost all adaptive neural systems share several features in common. Typically the processing elements of all systems have an output which is a function of the sum of the weighted inputs of the processing element. Almost all systems have a single layer of modifiable weights which affect the data transferred from the input to the output of the system.

The evolution of adaptive neural systems took a dramatic step forward with the development of an algorithm called "Back Propagation". This algorithm is fully described in the reference text "Parallel Distributed Processing, the Microstructure of Cognition", Rumelhart, Hinton, & Williams, MIT Press, 1986.

A back propagation system typically consists of three or more layers, each layer consisting of one or more processing elements. In one basic example, the system is comprised of an input layer, at least one hidden layer and an output layer. Each layer contains arbitrary, directed connections from the processing elements in the input layer to the hidden layer, and from the hidden layer to the output layer. There are no connections from processing elements to processing elements in the same layer nor connections from the output to the hidden layer nor from the hidden to the input layer; i.e. there are no cycles (loops) in the connection graph. (There are hypothesized mechanisms for networks with cycles in them, but they are not being scrutinized herein.)

In the Perceptron Model the idea of error was introduced. In a back propagation system, at each output processing element of the network, the error is quite easily realized. The error is typically the difference between an expected value and the output value. This error is used to modify the strength of the connection between a processing element and the output processing element. Ideally, this reduces the error between the expected output and the value output by the processing element in response to the input. The Perceptron Model lacks the ability to allocate an error value to the hidden processing elements and therefore cannot adjust the weights of any connections not coupled to an output processing element. In a system utilizing the Back Propagation algorithm, an error is assigned to the processing elements in hidden layers and the weights of the connections coupled to these hidden processing elements can be adjusted.

An acyclic Neural Network is comprised of only three layers of processing elements: the input, the hidden and the output layers. Each layer consists of one or more processing elements. There may be connections from the input to the hidden layer (input matrix elements), from the hidden to the output layer (output matrix elements), from the input to the output layer (direct matrix elements), and from hidden processing elements to other hidden processing elements (hidden matrix elements). In an acyclic network, a large constraint is placed on hidden matrix elements: if the hidden processing elements are numbered 1 to N, a matrix element may only connect from a lower numbered hidden processing element to a higher numbered processing element; remember that the directionality of a matrix element is important.

This three-layer description actually produces all possible layered environments; it describes an acyclic graph.

An acyclic Back Propagation Neural Network consists of the following.

A neural system utilizing backwards error propagation can be represented by two kinds of elements: processing elements and matrix elements.

A matrix element connects two processing elements and its primary function is to store the connection strength.

A processing element receives a net data and a net error signal, and produces a data and an error signal, which are functions of the two received signals. The functions can be mathematically expressed as:

$$\text{Output}_i = f(\text{NetInput}_i) \tag{1}$$

$$\text{Error}_j = f'(\text{NetInput}_j) \times \text{NetError}_j \tag{2}$$

A matrix element receives a data and an error signal and produces a net data and a net error signal which are a function of the two received signals. The functions can be mathematically expressed as:

$$\text{NetInput}_i = \sum_j \text{Weight}_{ji} \times \text{Output}_j \tag{3}$$

$$\text{NetError}_j = \sum_i \text{Weight}_{ji} \times \text{Output}_i \tag{4}$$

$$\frac{dw_{ji}}{dt} = \text{Learn\_Rate}_{ji} \times \text{Error}_j \times \text{Output}_i \tag{5}$$

The derivation of the discrete time Back Propagation Algorithm is described in Chapter 8 of *Parallel Distributed Processing*, by Rumelhart et al, and is recounted here.

A weight associated with a connection is referred to as $w_{ji}$. The subscripts are used in the form $w_{to,from}$. Hence, in the variable $w_{ji}$, i refers to the processing element from which data information is being received, and j refers to the processing element to which data information is sent. In the back propagation algorithm, a particular input stimulus vector is referred to collectively by the variable p (for pattern). The elements of a particular output vector and particular target vector are referred to respectively as $o_{pj}$ and $T_{pj}$, where j varies over the output processing elements. The Total Error of a system is represented by the variable E. The portion of the Error contributed by a single input vector (one input pattern) is represented by the variable $E_p$.

The output of a processing element $o_{pj}$, in response to an input pattern p, is calculated by the following equation (which also defines the value $\text{net}_{pj}$):

$$\text{net}_{pj} = \sum_i w_{ji} o_{pi} \tag{6}$$

$$o_{pj} = f(\text{net}_{pj}) \tag{7}$$

The techniques used by Back Propagation to minimize the Total Error is a variant of Least Mean Squared. The technique states that the total error is the square of the difference between the target vector and the output vector. Furthermore, it is assumed that the total error for the system is the linear summation of the error for any individual pattern.

$$E = \sum_p E_p \tag{8}$$

$$E_p = \frac{1}{2} \sum_j (T_{pj} - O_{pj})^2 \qquad (9)$$

In a Back Propagation network, error is minimized by adjusting the weights within the network. What is desired is to determine what amount to adjust a weight so that the error will be reduced. The following equation expresses that desire:

$$\frac{\partial E}{\partial w_{ji}} = \sum_p \frac{\partial E_p}{\partial w_{ji}} \qquad (10)$$

The above expression can be expanded by the chain rule to get:

$$\frac{\partial E}{\partial w_{ji}} = \sum_p \sum_k \frac{\partial E_p}{\partial \text{net}_{pk}} \frac{\partial \text{net}_{pk}}{\partial w_{ji}} \qquad (11)$$

We can expand the second component, $\partial \text{net}_{pk}/\partial w_{ji}$, by noting that $$\text{net}_{pk} = \sum_m w_{km} o_m,$$

to get the following $$\frac{\partial \text{net}_{pk}}{\partial w_{ji}} = \frac{\partial \left( \sum_m w_{km} o_m \right)}{\partial w_{ji}} \qquad (12)$$

It is easy to see that except when m=i and k=j, the above is zero. Putting this back into equation (11) we get:

$$\frac{\partial E}{\partial w_{ji}} = \sum_p \frac{\partial E_p}{\partial \text{net}_{pj}} o_i \qquad (13)$$

The first portion of the equation, $\partial E_p/\partial \text{net}_{pj}$, by expansion using the chain rule, gives:

$$\frac{\partial E_p}{\partial \text{net}_{pj}} = \sum_l \frac{\partial E_p}{\partial O_{pl}} \frac{\partial O_{pl}}{\partial \text{net}_{pj}} \qquad (14)$$

and $\partial O_{pl}/\partial \text{net}_{pj}$ can be simplified by recognizing $O_{pl} = f(\text{net}_{pl})$. By substituting this in, the expression becomes:

$$\frac{\partial O_{pl}}{\partial \text{net}_{pj}} = \frac{\partial f(\text{net}_{pl})}{\partial \text{net}_{pj}} \qquad (15)$$

It can now be noted that $\partial f(\text{net}_{pl})/\partial \text{net}_{pj}$ is zero, except when l=j; this gives us finally:

$$\frac{\partial O_{pj}}{\partial \text{net}_{pj}} = \frac{\partial f(\text{net}_{pj})}{\partial \text{net}_{pj}} = f'(\text{net}_{pj}) \qquad (16)$$

and this can be substituted back in to get:

$$\frac{\partial E}{\partial w_{ji}} = \sum_p \frac{\partial E_p}{\partial O_{pj}} f'(\text{net}_{pj}) o_i \qquad (17)$$

If we are examining an output node, the value of $\partial E_p/\partial O_{pj}$ is readily apparent from the definition of $E_p$, as in:

$$E_p = \frac{1}{2} \sum_j (T_{pj} - O_{pj})^2 \qquad (18)$$

Partial differentiation of this expression with respect to $O_{pj}$ gives the following expression for output processing elements:

$$\frac{\partial E_p}{\partial O_{pj}} = T_{pj} - O_{pj} \qquad (19)$$

Thus the error equation for an output value is:

$$\frac{\partial E_p}{\partial w_{ji}} = (T_{pj} - O_{pj}) f'(\text{net}_{pj}) o_i \qquad (20)$$

The problem remains what the error value is for the hidden processing elements. To determine this, let the definition of $\delta_{pj}$ be:

$$\delta_{pj} = \frac{\partial E_p}{\partial \text{net}_{pj}} \qquad (21)$$

From the expansion from above, we see:

$$\frac{\partial E_p}{\partial \text{net}_{pj}} = \frac{\partial E_p}{\partial O_{pj}} f'(\text{net}_{pj}) \qquad (22)$$

Expanding by the chain rule on $o_{pj}$, we get:

$$\frac{\partial E_p}{\partial O_{pj}} = \sum_k \frac{\partial E_p}{\partial \text{net}_{pk}} \frac{\partial \text{net}_{pk}}{\partial O_{pj}} \qquad (23)$$

Expanding $\partial \text{net}_{pk}/\partial O_{pj}$, by the definition $$\text{net}_{pk} = \sum_l w_{kl} o_l,$$

we get:

$$\frac{\partial \text{net}_{pk}}{\partial O_{pj}} = \frac{\partial \left( \sum_l w_{kl} o_{pl} \right)}{\partial O_{pj}} \qquad (24)$$

It is easy to see that the above is zero, except when l=j, so that we can state:

$$\frac{\partial \text{net}_{pk}}{\partial O_{pj}} = \frac{\partial w_{kj} o_{pj}}{\partial O_{pj}} = w_{kj} \qquad (25)$$

Substituting this back into the above equation, we get:

$$\frac{\partial E_p}{\partial O_{pj}} = \sum_k \left( \frac{\partial E_p}{\partial \text{net}_{pk}} w_{kj} \right) \qquad (26)$$

By the definition of $\delta_{pj}$, we can then state:

$$\frac{\partial E_p}{\partial O_{pj}} = \sum_k (\delta_{pk} w_{kj}) \qquad (27)$$

Therefore, $\delta_{pj}$ for a hidden node can be expressed as:

$$\delta_{pj} = f'(net_{pj}) \sum_k (\delta_{pk} w_{kj}) \tag{28}$$

Combining all the above elements together, we get:

$$\frac{\partial E_p}{\partial w_{ji}} = \delta_{pj} o_{pi} \tag{29}$$

and from this, the Total Error equation can be formulated:

$$\frac{\partial E}{\partial w_{ji}} = \sum_p \delta_{pj} o_{pi} \tag{30}$$

For an output processing element, $\delta_{pj}$ is:

$$\delta_{pj} = f'(net_{pj})(T_{pj} - O_{pj}) \tag{31}$$

For a hidden processing element, $\delta_{pj}$ is:

$$\delta_{pj} = f'(net_{pj}) \sum_k (\delta_{pk} w_{kj}) \tag{32}$$

Now, the change of the weight is set proportional to the above partial differentiation. This is given by the following equation:

$$\nabla w_{ji} = \mu \delta_{pj} o_{pi} \tag{33}$$

The constant of proportionality ($\mu$) is the Learn Rate. Experimentally, this constant has been found to be in the range of 0.5 to very small, depending on the number of weights, processing elements and patterns which are to be presented.

Note that there is no guarantee that any one particular weight change for a particular pattern will decrease the total error; it is actually quite probable that during one of the patterns the total error will increase, just that over all the patterns the total error should decrease.

In summary, back propagation may be described as follows. On a forward pass of information through the network, all of the processing element outputs are calculated by propagating the information input forward through the network, i.e. from the input layer to each hidden layer in turn and finally to the output layer. On a backward pass, i.e. from the output layer to the hidden layers, each in reverse order from before and finally to the input layer, all the errors are calculated by propagating the associated error backwards through the network. Finally, all the weights are changed according to the errors in the processing elements above and the outputs of the processing elements below.

The Back Propagation Algorithm as originally developed and as described to this point is a discrete time algorithm, in that there is a forward pass, a backwards pass and modification to the weights, and then a recycling. However, this is not an optimal implementation of the system. There is an implicit assumption of linearity during these discrete time intervals. This is generally not a good assumption.

A better implementation of the system is for the network to run continuously, performing each of the operations simultaneously; this is the basis of what is called herein a continuous time system. The following is a derivation of the continuous time model of the Back Propagation Algorithm, as developed by this inventor. Instead of taking the derivative of the Error with respect to any particular weight, the derivative is taken with respect to time. It is desired to have the error monotonically decreasing, and it is shown that this is done in a straightforward manner. The chain rule can be applied taking the partial differentiation with respect to $w_{ji}$.

$$\frac{dE}{dt} = \sum_{ji} \frac{\partial E_p}{\partial w_{ji}} \frac{dw_{ji}}{dt} \tag{34}$$

Repeating equation (30), as derived in the discrete time algorithm:

$$\frac{\partial E}{\partial w_{ji}} = \sum_p \frac{\partial E_p}{\partial w_{ji}} = \sum_p \delta_{pj} o_{pi} \tag{35}$$

This can then be replaced into equation (34) to give:

$$\frac{dE}{dt} = \sum_{ji} \left( \sum_p \delta_{pj} o_{pi} \right) \frac{dw_{ji}}{dt} \tag{36}$$

To ensure that the derivative of the Error is monotonically decreasing, the sign of dE/dt must be negative. The only way to do this is to ensure that the sign of $dw_{ji}/dt$ is the opposite sign of $$\sum_p \delta_{pj} o_{pi}.$$

By arbitrarily setting $$\frac{dw_{ji}}{dt} = -\mu \sum_p \delta_{pj} o_{pi} \tag{37}$$

this constraint is satisfied, by giving us:

$$\frac{dE}{dt} = -\mu \sum_{ji} \left( \sum_p \delta_{pj} o_{pi} \right)^2 \tag{38}$$

Since the derivative of the Error is monotonically decreasing, the system will converge at some final error value. As derived, a system is not guaranteed to converge to a zero Error. Experimental results show that a system generally will converge to zero error if the problem to be solved is representable by the network. It is not known at this time how to detirmine if a problem to be solved is representable by a particular network. If the system does not converge to a small error, or does not reliably converge, adding a small number of additional processing elements and connections will lead to convergence.

FIG. 1 is a diagrammatic representation of an acyclic Back Propagation Neural Network, having six processing elements: two input processing elements, two hidden processing elements and two output processing elements. This, of course, is a very small exemplary network, but from the drawings and description of this representative network it can be seen that a similar network can be constructed comprising thousands (or millions) or processing elements.

In FIG. 1, processing elements are denoted generally as 20's with input layer processing elements 20a and 20b, hidden layer processing elements 20c and 20d, and output processing elements 20e and 20f. As shown on processing element 20e, processing elements may have four lines: two output signal lines, Data 11 and Error 14;

and two input signal lines, Net Data 13 and Net Error 12. The postscript "e" designated that the lines are associated with processing element 20"e".

Matrix elements are denoted generally as 10's. Matrix elements 10 have data, error, net data and net error lines which are connected to the similarly named lines of the connected processing elements, as diagrammed.

The two elements of the input vector are transfered respectively to the system via input stimulus 1 line 31 and input stimulus 2 line 32, which are connected to the Net Data lines of input processing elements 20a and 20b, respectively. The two elements of the output vector are available on Output Value 1 line 35 and Output Value 2 line 36, respectively, and are generated by the data lines of output processing elements 20e and 20f, respectively. The two elements of the error vector are transfered respectively to the system via Error Stimulus 1 line 33 and Error Stimulus 2 line 34, which are connected to the Net Error lines of output processing elements 20e and 20f, respectively.

FIG. 2 is a schematical block diagram illustration, a matrix representation, of the layout of the system diagrammatically represented in B FIG. 1.

Processing elements 20a' through 20f' correlate with processing elements 20a through 20f, respectively, of FIG. 1. Matrix elements 10a' through 10m' correlate with matrix elements 10a through 10m respectively, of FIG. 1. All signal lines, 11a' through 14f' correlate with signal lines 11a through 14f, respectively, of FIG. 1. The input, output and error lines 31' through 36' correlate with the input, output and error lines 31 though 36 of FIG. 1.

An input stimulus vector, comprised of input stimuli Input 1 on line 31' and Input 2 on line 32', are connected to processing elements 20a' and 20b', respectively, as is done in FIG. 1. The output of processing element 20a' is connected to matrix elements 10a' through 10d' via Data line 11a'. Similarly, the output of processing element 20b' is connected to matrix elements 10e' through 10h' via Data line 11b'. Matrix Elements 10a' and 10e' sum their Net Data outputs on Net Data line 13c'. This summation on 13c' is provided as the Net Data input to processing elements 20c'. Processing Element 20c' provides its Data output signal on Data line 11c', to the Data input line of Matrix Elements 10i' through 10k'. Matrix Elements 10b', 10f' and 10i' sum their Net Data output signals on Net Data line 13d', which is provided as the Net Data input signal to Processing Element 20d'. Processing Element 20d' provides its Data output signal on Data line 11d', to the Data input line of Matrix Elements 10l' and 10m'. Processing elements 10c', 10g', 10j' and 10l' sum their Net Data output signals on Net Data line 13e', which is provided as the Net Data input signal to Processing Element 20e'. Matrix elements 10d', 10h', 10k' and 10m' sum their Net Data output signals on Net Data line 13f, which is provided as the Net Data input signal to Processing Element 20f'.

Processing elements 20e' and 20f' provide output signals Output 1 and Output 2, respectively, on lines 35' and 36', respectively. These outputs form the output vector.

An error stimulus vector, composed of error stimuli Error 1 on line 33' and Error 2 on line 34' are received by the Net Error lines of Processing Elements 20e' and 20f', respectively, The Error output signal of Processing Elements 20f' is provided on Error line 14f' to Matrix Elements 10m', 10k', 10h' and 10d'. The Error output signal of Processing Elements 20e' is provided on Error line 14e' to Matrix Elements 10l', 10j', 10g' and 10c'. The Net Error outputs of Matrix Elements 10l' and 10m' are summed on Net Error line 12d' and is provided to the Net Error input line of Processing Element 20d'. The Error output signal of Processing Elements 20d' is provided on Error line 14d' to Matrix Elements 10i', 10f' and 10b'. The Net Error outputs of Matrix Elements 10i' through 10k' are summed on Net Error line 12c' and is provided to the Net Error input line of Matrix Element 20c'. The Error output signal of Processing Elements 20c' is provided on Error line 14c' to Matrix Elements 10e' and 10a'. The Net Error outputs of Matrix Elements 10e' through 10h' are summed on Net Error line 12b' and is provided to the Net Error input line of Processing Element 20b'. The Net Error outputs of Matrix Elements 10a' through 10d' are summed on Net Error line 12a' and is provided to the Net Error input line of Processing Element 20a'.

In the example the Error output signals of Processing Elements 20a' and 20b' are not used; often this will be the case, and as such a minimal system does not include the functional parts necessary to provide the Error output signal of input processing elements, such as 20a' and 20b', nor the functional parts to provide a Net Error output for the matrix elements connected to the input processing elements. The example is provided with the Error output signals of Processing Elements 20a' and 20b' and the Net Error output signals for Matrix Elements 10a' through 10h' for clarity and uniformity. A system can be built in this manner with no loss of generality.

Most Neural Networks sum the data inputs on a line and then provide a "squash" of the resultant summation, i.e., a non-linear function which reduces the range of the summation from the possible minus infinity to positive infinity range of the net input to some smaller dynamic range, such as from zero to one.

FIG. 3a illustrates a typical squash function used often in Back Propagation. Its mathematical formula is:

$$F(x) = \frac{1}{1 + e^{-x}} \tag{39}$$

In a Back Propagation Neural Network the derivative of the squash function that is used in the forward propagation of the data is required to modify the backwards propagation of error.

FIG. 3b illustrates a the derivative of the function illustrated in FIG. 9a. It mathematical formula is:

$$F'(x) = \frac{e^{-x}}{(1 + e^{-x})^2} \tag{40}$$

Producing hardware implementations of these functions with the required accuracy is difficult.

Prior art neural networks using the Back Propagation Algorithm have been frequently implemented on computer systems and are now being designed and built as fully analog VLSI circuits. These fully analog VLSI instantiations suffer from the design limitations of analog circuitry, in particular because of the offset errors of the analog circuits. While it has been shown that small networks of these fully analog circuits can be built, it has not been demonstrated that larger networks can be built utilizing fully analog mechanisms, and it is believed by this inventor that without significant circuitry or significant circuitry advances to alliviate these offset errors, a fully analog circuit will not be able to scale up.

Therefore there exists a need for: a new and improved adaptive neural network circuit design which will enable the system to overcome the difficulties associated with analog multiplier offset errors, and a new and improved method for the calculation of a a"squash" function and its derivative, and a new and improved method for the transmission of information along neural network pathways which enhances the networks' immunity to random noise interference.

The invention described herein is a family of circuits which are an instantation of *The Spike Model*, after the main mechanism whereby information is transferred. The Spike Model is a mathamatical model, derived by the inventor.

It is generally believed that a neuron transmits (at least part of) the forward flow of data information by representing the information as the frequency of the firing of spikes along its axon. Most abstract neural models represent the firing frequency as a real number, rather than attempting to simulate each and every individual spike. Most neural network models sum the inputs and then provide a "squash" of the resultant sum when processing the incoming information for a single processing element. This is equivalent to summing the input frequencies, then squashing the resultant summation.

The invention utilizes a spike train as the primary method of forward data transmission and extorts several major advantages from it. In this model, instead of summing the inputs, the inputs are (in essence) logically OR'ed together. If two spikes occur simultaneously on the inputs, only a single spike gets through. The resultant "squash" function under this mechanism is (the assumptions and derivations are detailed later in this disclosure):

$$Q^+ = 1 - e^{-net+} \tag{41}$$

where $Q^+$ is the probability that any output of a unit is a one and net+ is (essentially) the total number of spikes being generated by the units.

This function is approximately the upper "half" of the stereotypical sigmoid "squash" functions currently used in most Back Propagation networks, where net+ is the weighted number of excitatory spikes.

Since the number of spikes is exactly the summation of frequencies, this gives not a summation of frequencies, but rather a nice "squash" function, *without paying for it!*

One of the next major requirements of the Back Propagation Algorithm is the backwards flow of error. Specifically, there is a linear summation of the backwards flowing error and a multiplication of it by the net input (number of spikes) run through the derivative of the squash function, i.e.:

$$\text{backwards error} \times \text{squash'(number of spikes)} \tag{42}$$

By examining the total of all the times between the pulses, one can find an interesting space. The amount of this time corresponds to:

$$\text{OffTime} = 1 - \text{OnTime} \tag{43}$$

or $$\text{OffTime} = e^{-\text{number of spikes}} \tag{44}$$

This is exactly the derivative of the squash function (from equation 41). Therefore, if the error is propagated backwards when no spikes are present (or equivalently, only *examined* when there are no spikes present), the time averaged multiplication is exactly a multiplication of the error by the derivative of the squash function with respect to the net input—*precisely what is desired!*

The third component of Back Propagation is the way the weights are updated. This is (essentially):

$$\frac{dw_{ji}}{dt} = \text{Output Below} \times \text{Error Above} \tag{45}$$

If the error in a node above is represented in a spike method, the calculation for the change of the weights is simple. It is (essentially) the logical AND of the forward flowing spiked data signal and the spiked error signal.

If all signals in the network are represented as spikes, much of the noise problems associated with pure analog signals is alleviated.

This disclosure derives various mathematical components of the model, and details various circuits which can be utilized in the instantiation of this model. It should be noted that this model retains essentially all the speed of a full analog implementation, in that all circuits can still be implemented in the psuedo-neural network. The only speed lost is that the frequencies of the spikes, which remaian the primary information carrying portion of the signal, can only be actually detected with substantially more than two spikes present. It appears that this time will need to be a factor of ten longer than theoretically anticipated with a pure analog instantiation.

SUMMARY OF INVENTION

According to the invention, a neural network includes a plurality of matrix elements, each receiving an input data value and producing an output data value that is function of the input data value. The output data value is in the form of a spike train wherein the value of the data is represented by the duty cycle and/or the frequency. A combining element, such as a simple wire, produces a combining element output data value pulse train by logically OR'ing the matrix element output data value spike trains. In this simple and elegant manner, a squash function is performed (such as $1-e^{-\Sigma inputs}$). A processing element receives the combining element output data value pulse train and produces, in response thereto, a processing element output data value, which is the time average of the combining element output data value pulse train.

According to another aspect of the invention, the duty cycle of the matrix element output data value spike train is proportional to the product of the matrix element's weight value and input data value.

The matrix element input data value may be a spike train wherein the data value is represented by a frequency. According to another aspect of the invention, the frequency of the matrix element output data value spike train is equal to the frequency of the matrix element's input data value and the width of the output spike is proportional to the matrix elements's weight value.

In an exemplary embodiment of the invention, the above improvements are included in a back propagation neural network that includes the backward flow of error data on the combining element line. The processing element receives an input error value and, in response thereto and dependent thereon, outputs an output error value as an analog value on the combining element line during the offtime, i.e. when no OR'ed data spikes are present. This means that only a single wire is necessary for the transmission of both forward data information and backwards error information between the output of a matrix element and the input of a processing element.

As part of the requirements imposed by the derivation of the back progation algorithm, it is necessary to multiply the backwards flow of error information with the derivative of the squash function. As an aspect of the invention it is demonstrated that the this multiplication can be performed by sampling the backwards flow of error information only when no OR'ed data spikes are present on the output of the combining element.

The reason this works is that the off-time, computationally, is equivalent to $e^{-\Sigma inputs}$, which is the derivative of the squash function. It is also necessary, for the back propagation algorithm, to multiply this sampled signal by the input data value. As a further aspect of the invention, it is shown that this can be accomplished by sampling the above sampled signal during the time when an input spike is present.

The backwards flow of error information is further transmitted backwards to the processing element below the matrix element during the off-time of the output data spike train from that processing element below. This means that only a single wire is necessary for the transmission of both forward data information and backwards error information between the input of a processing element and the output of a matrix element.

In another exemplary embodiment of the invention seperate transmission pathways are used for the forward data and backwards error information flow. This results in simplified circuitry at the expense of more interconnections. In this embodiment, all transmissions can be performed by spike trains.

When all forward data and backwards error transmissions are performed by spike trains, the weight update can be accomplished simply by logically AND'ing the complement of the output of the combining element, the backwards flowing error spike train,

BRIEF DESCRIPTION OF DRAWINGS

The structures, objects, and advantages of the present invention will become apparent from the following detailed description, taken in conjunction with the accompanying drawings, in which like reference numerals correspond throughout and wherein:

FIG. 3a is a graphical representation of a typical squash function.

FIG. 3b is a graphical representation of the derivative of the squash function in FIG. 3a.

DETAILED DESCRIPTION OF THE PREFERRED EMBODIMENTS

I: Forward Propagation via Spike Trains

Figure 1:
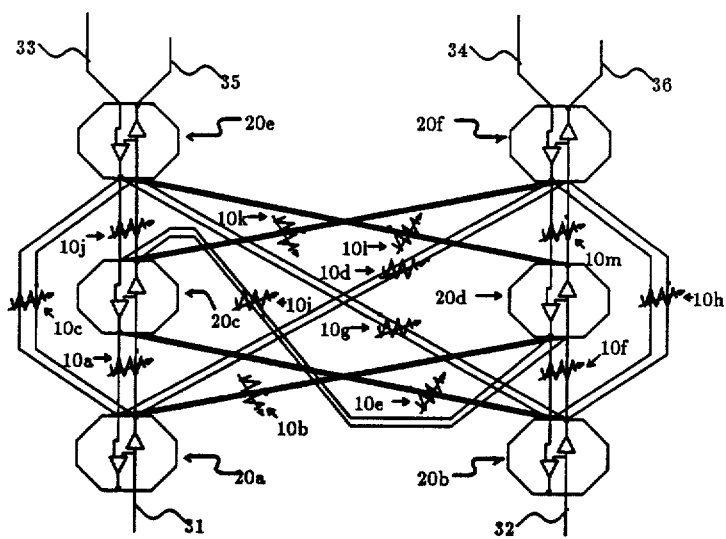
FIG. 1 is a diagrammatic representation of an acyclic Back Propagation Neural Network.

According to a first aspect of the invention, a spike train is used for information transfer in a neural network.

It is generally believed that a neuron transmits (at least part of) the forward flow of data information by representing the information as the frequency of the firing of spikes along its axon. Most abstract neural models represent the firing frequency as a real number, rather than attempting to simulate each and every individual spike. Most neural network models sum the inputs and then provide a "squash" of the resultant sum when processing the incoming information for a single processing element. This is equivalent to summing the input frequencies, then squashing the resultant summation.

This invention utilizes a spike train as the primary method of forward data transmission and extorts several major advantages from it. In this invention, instead of summing the inputs, the inputs are (in essence) logically OR'ed together. If two spikes occur simultaneously on the inputs, only a single spike gets through. The resultant "squashh" function under this mechanism is (the assumptions and derivations are detailed later in this disclosure):

$$Q^+ = 1 - e^{-net+} \qquad (46)$$

where $Q^+$ is the probability that any output of a unit is a one and net+ is (essentially) the total number of spikes being generated by the units.

This function is approximately the upper "half" of the stereotypical sigmoid "squash" functions currently used in most Back Propagation networks, where net+ is the weighted number of excitatory spikes.

Since the number of spikes is exactly the summation of frequencies, this gives not a summation of frequencies, but rather a nice "squash" function, *without paying for it!*

In a Neural Network paradigm, often positive and negtive weight values are allowed. It is easiest to represent only positive or negative values with a pulse train, and it is easiest to understand the workings of this invention for the "squash" function by examining the excitatory (positive) data spikes, rather than both the excitatory and inhibitory (negative) data spikes, associated with positive and negative weights. Two methods are disclosed which both derive the same result. The first, recounted in the next section utilizes syncrounous pulse trains. The second, recounted in the subsequent section utilizes asyncrounous pulse trains.

II: Poisson Derivation of Excitatory Spikes

By making the assumption that there are enough inputs to a neuron, it is reasonable to assume a near Poisson distribution of the spikes reaching the neuron, as a mathematical simplification. Another derivation is given in the next section wherein this assumption is not made; an identical result is derived. This is an even safer assumption if an event has just occurred, and the neuron is experiencing the premier spikes triggered by the event; the arrival of the pulses will primarily be timed by the interconnection strengths, delay times, etc., and not be factored at all by the cyclical frequency nature of a singularly firing neuron, which is the primary debilitation of the Poisson assumption. And furthermore, the cyclical output pulses of a neuron can be made to occur irregularly (in a hardware implementation), with a psuedo-random distribution equaling a Poisson distribution. This should alleviate most fears of the assumption.

Imagine now, for simplicity that we have a system wherein these spikes are synchronous and of unit time duration. If there are P spikes on N lines which are being OR'ed together, in a single time sample of S time units, some number of these unit time spaces will be filled, while others unfilled. If a large number of these samples are run, there will emerge an expected number of time spaces which are filled.

From the formulas of Poisson distribution:

$$P[X = x, \lambda] = \frac{e^{-\lambda} \lambda^x}{x!} \tag{47}$$

where $\lambda$ is the mean number of events occurring during the time interval of a simulation. The probability $P[X=x,\lambda]$ is the probability that exactly X events will occur during that time interval.

Given a large number of spikes during a time interval, some of these spikes will overlap one another. During this time, since they are being OR'ed together, they will act as if they are a single spike. Hence, for a given number of input spikes the number of apparent output spikes is given by the following derivation:

$$P[X \geq 0, \lambda] = 1 - P[X = 0, \lambda] \tag{48}$$

$$= 1 - \frac{e^{-\lambda} \lambda^0}{0!} \tag{49}$$

$$= 1 - e^{-\lambda} \tag{50}$$

While this is a derivation for a synchronous model, the effects are readily convertible to a continuous model wherein the duration of the spikes is variable and asynchronous. This is demonstrated in the next section as an alternative way of deriving the Probability for Excitatory Spikes.

These Probability Functions can be translated to the forward activation for excitatory spikes. To do this, let the forward activation function be set to the probability that the output will be a one at any given moment. Let the symbol $Q^+$ denote the probability that the output is one (from only the Excitatory Pulses, and not counting the Inhibitory Pulses). Let the symbol net$^+$ denote the total number of spikes arriving during a sampling period. Therefore, the average probability that an output is one (and consequently the forward activation function for excitatory spikes) is:

$$Q^+ = 1 - e^{-net^+} \tag{51}$$

III: Instantaneous Probabilities for Excitatory Spikes

For the following derivation, everything is examined at an instant of time. From this, an instantaneous probability that the OR'ed line will be high is derived.

Let each input line i have a Probability $P_i^+$ *of being a* 1 at that instant.

Assume that each probability $P_i^+$ is small. In a hardware implementation this assumption implies that the width of the spikes should be narrow relative to the frequency of firing. This does not appear to be an unreasonable restriction.

Assume that all the probabilities $P_i^+$ are independent. This is probably not a good assumption, but without this assumption interesting results have not been forthcoming.

The probability that the outcome is high, given that the lines are being OR'ed together is:

$$Q^+ = 1 - \prod_{i=1}^{N} (1 - P_i^+) \tag{52}$$

Let $G^+$ be defined to be the product term in equation 52. It is the object of this section to simplify $G^+$.

If all the probabilities are small they can be approximated as:

$$G^+ \approx \left( 1 - \frac{\sum_{i=1}^{N} P_i^+}{N} \right)^N \tag{53}$$

This assumption changes equation (52) only slightly when all the probabilities are small. It assumes that instead of using N individual probabilities, only one is used, and that value is the average of all the other probabilities. Given that all $(1-P_i^+)$ values will be near 1, this is fairly accurate.

Let net$^+ = \sum_{i=1}^{N} P_i^+$. Let $G(net^+) = \left(1 - \frac{net^+}{N}\right)^N$.

Equation (53) can be readily expanded by a Taylor (MacLaurin) series as in:

$$G(net^+) = 1 - \sum_{j=0}^{\infty} \frac{(net^+)^j}{j!} Q^{(j)}(0) \tag{54}$$

where $G^{(j)}(0)$ is the $j^{th}$ derivative of the function $G(net^+)$ from equation 0, evaluated at 0. The first few derivatives of $G(net^+)$ are given here:

$$G^{(1)}(\text{net}^+) = \frac{N}{N}\left(1 - \frac{\text{net}^+}{N}\right)^{(N-1)} \tag{55}$$

$$G^{(2)}(\text{net}^+) = -\frac{(N-1)N}{N^2}\left(1 - \frac{\text{net}^+}{N}\right)^{(N-2)} \tag{56}$$

$$G^{(3)}(\text{net}^+) = \frac{(N-2)(N-1)N}{N^3}\left(1 - \frac{\text{net}^+}{N}\right)^{(N-3)} \tag{57}$$

$$G^{(4)}(\text{net}^+) = -\frac{(N-3)(N-2)(N-1)N}{N^4}\left(1 - \frac{\text{net}^+}{N}\right)^{(N-4)} \tag{58}$$

Generalizing the above, we get:

$$G^{(j)}(\text{net}^+) = (-1)^j \frac{\prod_{i=0}^{j-1}(N-i)}{N^j}\left(1 - \frac{\text{net}^+}{N}\right)^{(N-j)} \tag{59}$$

The above is valid for $j \geq 1$. Since, for the first, and most significant terms in the Taylor expansion $N > j$ (for problems of significant size, where N is large), the center term in equation (59) reduces approximately to:

$$\frac{\prod_{i=0}^{j-1}(N-i)}{N^j} \approx \frac{N^j}{N^j} = 1 \tag{60}$$

Substituting this into equation (59) and evaluating the expression at 0 gives:

$$G^{(j)}(0) = (-1)^j\left(1 - \frac{0}{N}\right)^{(N-j)} \tag{61}$$

$$= (-1)^j \tag{62}$$

Therefore, substituting this into equation (54), the Taylor expansion is approximately:

$$G(\text{net}^+) \approx 1 - \sum_{j=0}^{\infty} \frac{(\text{net}^+)^j}{j!}(-1)^j \tag{63}$$

$$= 1 - \sum_{j=0}^{\infty} \frac{(-\text{net}^+)^j}{j!} \tag{64}$$

The summation term of equation (64)) is exactly the series expansion of $e^{-\text{net}^+}$. Equation (52) can reduced by replacing G(net+) into the expression (which is the desired equation):

$$Q^+ = 1 - e^{-\text{net}^+} \tag{65}$$

This is not a mathematically rigorous solution. It is an engineering solution, at best. These does not appear to exist a closed solution. This is an attempt to surround the problem with a tractable answer.

IV: Inhibitory Spikes

Assuming excitatory and inhibitory spikes are statistically independent of one another, and that the probability of inhibitory spikes (independent of excitatory spikes) can be derived in a manner similar to excitatory spikes, the following formula can be stated:

$$Q^- = 1 - e^{-\text{net}^-} \tag{66}$$

where $Q^-$ is the probability that any inhibitory spike is present and net$^-$ is the total number of inhibitory spikes counted on all lines during a sampling period, or the total of all probabilities on all input lines, depending on the derivational method utilized.

Finally, the model being presented here states that if an excitatory and inhibitory spike both occur simultaneously the inhibitory spike causes the complete nullification of any output spike. This model is biologically motivated (generally, in a neuron an ihibitory spike will dominate, and causes all output from the neuron to cease), though the model is not in any way a close representationof biological reality.

The following formula accounts for this behaviour:

$$Q = Q^+ - Q^+ Q^- \tag{67}$$

where Q is the activation function of a neuron having both excitatory and inhibitory pulses being presented to it.

Equation (67) states that the total probability is equal to the probability of an excitatory pulse being present less the probability that both an excitatory and inhibitory are present.

This can be reduced as follows:

$$= Q^+(1 - Q^-) \tag{68}$$

$$= (1 - e^{-\text{net}^+})(1 - (1 - e^{-\text{net}^-})) \tag{69}$$

$$= e^{-\text{net}^-}(1 - e^{-\text{net}^+}) \tag{70}$$

Therefore, this shows that by combining together pulse trains as specified, the squash function can be approximated as in Equation 70. Experimental results show that this works in a Back Propagation environment. It is anticipated that this squash function will work in many other neural networks algorithms.

V: How to Implement Multiplication without Working for It

A method is needed to multiply forward data spikes (and possibly reverse propagating error spikes) by weight values. The weight values generally are scalars, rather than frequencies. The data from a lower processing element is being fed forward as a continuous spike train; the activation level of the lower processing element is represented by the frequency of firing of that processing element. The width of that spike before it arrives at the synaptic circuit is irrelevant. The only information being transferred is how frequently the spikes occur. However, the information present after the spike is transferred from the synaptic weight but before it is OR'ed into the raw data line is of importance. The value being OR'ed in to the raw data line should have a probability of being one (i.e.: high or true) which is proportional to the multiplication of the data and the weight. This can be readily accomplished if the width of the spike relates to the synaptic weight and the number of spikes relates to the number of incoming spikes. This gives exactly what is desired for feeding into the forward flowing Data Line.

Figure 4:
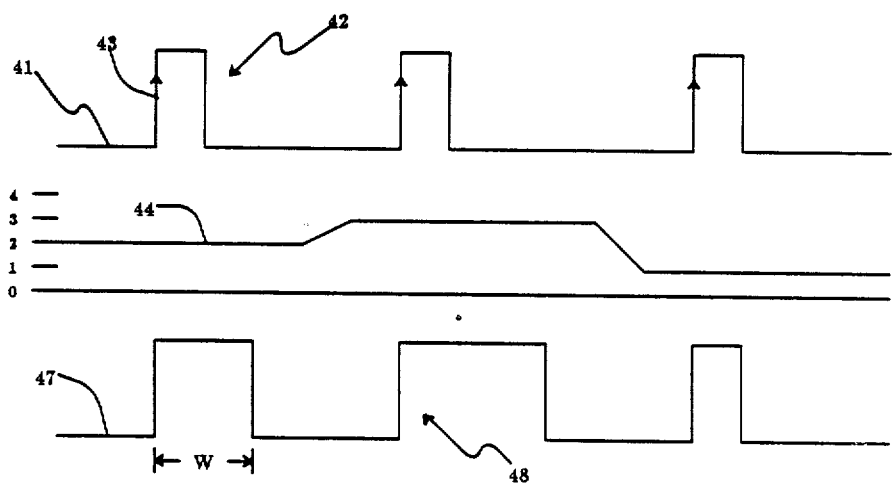
FIG. 4 illustrates the input and output characteristics of a Pulse Width Modulator, as defined in the present disclosure.

FIG. 4 illustrates the input/output characteristics of this basic function which will be referred to as a Pulse Width Modulator (PWM). There are devices already using this name, so this may cause some confusion. However, it is an extremely accurate name for the device as used herein.

FIG. 4 has three components. Typical input signal trace 41 comprises a series of pulses 42, each having a leading edge 43. Input weight signal trace 44 varies in magnitude. The resultant output of the PWM is output signal trace 47 consisting of pulses, denoted generally as 48. Note that each output pulse is triggered by the input pulse leading edge, and that the width W of each output pulse is proportional to the value of the weight signal input value. Other mechanisms with similar characteristics are viable.

A typical circuit for a PWM can be described as follows: the input spiked signal triggers a flip-flop; an asynchronous feed-back loop resets the flip-flop; there is a time-delay in the ouput; this delay is determined by the voltage on a leakage transistor; the higher the voltage, the faster the circuit resets. Other methods of implementing this circuit will be obvious to those skilled in the art.

It is desired that on the backwards flow of information that the summation be essentially linear, to remain within the bounds proscribed by Back Propagation. However, on the backwards flow of error information, a PWM can nonetheless still be used. Since collisions will occur, what is desired is to reduce the number of collisions, until they are negligable (and the system responds in a nearly linear manner).

Experimentally, it has been seen that the values of net+ range from 0 to 10, in medium sized networks. They rarely will go over 10. If the number of resultant spikes is divided by a factor of ten in these situations, the exponential term becomes nearly linear (becase $1-e^{-x} \approx x$, when x is small).

VI: Implementing Forward Propagation with Spike Trains

Figure 5A:
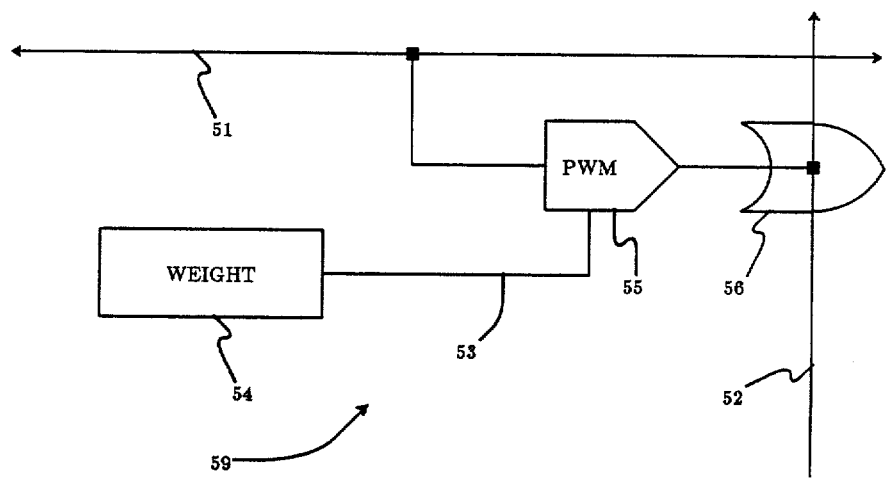
FIG. 5a is a block circuit diagram of a type 0 matrix element.
Figure 5B:
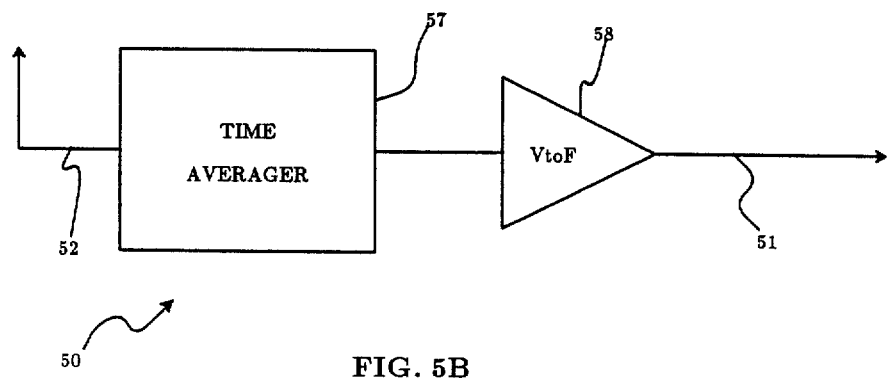
FIG. 5b is a block circuit diagram of a type 0 processing element.

FIGS. 5a and 5b together depict an implementation of a Neural Network, referenced herein as a Type 0 Neural Network. FIG. 5a shows a matrix element, denoted generally as 59, and FIG. 5b depicts a processing element, denoted generally as 50. It is important to note that if these elements 59 and 50 are connected in a matrix configuration, such as exampled in FIG. 2, with type 0 matrix elements 59 in matrix element locations 10's, and with type 0 processing elements 50 in processing elements 20's locations, the forward data propagation function can be performed.

Also with reference to FIG. 2 it should be noted that hereinafter an element that serves the function of one of the horizontal transmission line pairs (e.g. 11a' and 12a', 11b' and 12b', 11c' and 12e', and 11d' and 12d') may be refered to as a horizontal combining element. The horizontal combining elements may be further distinguished as an input horizontal combining element, i.e. one connected to an input processing elment, or as a hidden horizontal combining element, i.e., one connected to a hidden processing element. Also, an element that serves the function of one of the vertical transmission line paris (e.g. 13c' and 14c', 13d' and 14d', 13e' and 14e', or 13f' and 14f'), may be refered to as a vertical combining element. Matrix elements that directly couple with an input processing element may be refered to as "input" matrix elements (e.g. in FIG. 2, matrix elements 10a' through 10h'). Matrix elements not directly couples to an input processing element may be refered to as "hidden" matrix elements (e.g. in FIG. 2, matrix elements 10i' through 10m').

Line 51 on both FIGS. 5a and 5b conveys the output of a processing element to all the matrix elements to which it is connected. Line 52 on both FIGS. 5a and 5b serves as the combining unit while simultaneously conveying the output of the combining unit to processing element above. Line 53 on FIG. 5a connects weight value 54 (which may be thought of as a fixed weight value for this explanation) to the Pulse Width Modulator 55. The other input to the Pulse Width Modulator is taken from Line 51, and the output of the Pulse Width Modulator is OR'ed by element 7 onto Line 2. Line 52 terminates in FIG. 5b at time averaging element 57. Time averaging element 57 averages the input from line 52 over time, and provides an output which represents that average. Voltage to Frequency Element 58 produces an output frequency which is dependent upon the input value. Line 51 originates at the output of element 58.

It is important to note that FIG. 5b represents a hidden processing element and that the input and output processing elements may vary from the representation to accomodate the desired input or output vector. For example, if the input vector is a voltage, then time averaging element 57 is not needed in the input processing element; and, if a voltage output is desired, then voltage to frequency element 58 may not be needed in an output processing element.

VII: A Method of Implementing the Derivative of the Squash Function

One of the major requirements of the Back Propagation Algorithm is the backwards flow of error. In the backwards flow of error, there is a linear summation of the backwards flowing error and a multiplication of it by the net input (number of spikes) run through the derivative of the squash function, i.e.:

$$\text{backwards error} \times \text{squash'(number of spikes)} \tag{71}$$

By examing the total of all the times between the pulses, one can find an interesting space. If we ignore inhibitory spike for the moment, the amount of this time corresponds to:

$$\text{OffTime} = 1 - \text{OnTime} \tag{72}$$

As it has been shown in equation 51

$$\text{OnTime} = 1 - e^{-\text{number of spikes}} \tag{73}$$

or $$\text{OffTime} = e^{-\text{number of spikes}} \tag{74}$$

This is exactly the derivative of the squash function (from equation 46). Therefore, if the error is propagated backwards when no spikes are present (or equivalently, only *examined* when there are no spikes present), the time averaged multiplication is exactly a multiplication of the error by the derivative of the squash function with respect to the net input—*precisely what is desired*!

Having two parameters in the squash function (as was derived in equation 0) poses a problem for the back propagation algorithm, as the activation function is now a function of two variables, rather than the single one before. This can be accounted for by taking the partial derivatives of the activation function first with one variable and then with another.

$$\frac{\partial Q}{\partial net^+} = e^{-(net^+ + net^-)} \quad (75)$$

$$\frac{\partial Q}{\partial net^-} = e^{-(net^+ + net^-)} - e^{-net^-} \quad (76)$$

This means that the *squash* function and its derivatives (of Back Propagation) can be stated as:

$$f(net^+, net^-) = e^{-net^-}(1 - e^{-net^+}) \quad (77)$$
$$f_{net+}'(net^+, net^-) = e^{-(net^- + net^+)} \quad (78)$$
$$f_{net-}'(net^+, net^-) = -e^{-net^-}(1 - e^{-net^+}) = -f \cdot (net^+, net^-) \quad (79)$$

It is necessary to examine the time intervals that we have ready access to, to determine if there exists any time interval which is equivalent to the partial derivative of the squash function with respect to one or the other of its parameters.

The time when either type of spike (either excitatory or inhibitory) is present is:

$$\text{time (any spike present)} = 1 - e^{-(net^+ + net^-)} \quad (80)$$

(Equation (80) can be quickly derived using the identical methods used in previous sections.) The time when no spikes are present is calculated as:

$$\text{time (no spike present)} = 1 - \text{time (any spike present)} = e^{-(net^+ + net^-)} \quad (81)$$

This means that the partial derivative of the activation function with respect to the excitatory inputs is the equal to the time when no spikes, excitatory or inhibitory, are present. To do backwards propagation of error for weights connected to excitatory synapses one can use the time-multiplication of the error with time when no spikes are present.

Given from equation 79 that $$\frac{\partial Q}{\partial net^-} = -Q \quad (82)$$

we can see that to for the backwards propagation of the error via weights connected to inhibitory synapses, one can use the time multiplication of the error with the time when "output" spikes are present (as long as the sign of the weight change is changed accordingly). This means that, by using the methods of the present invention, the computation of both the forward squash function and the derivatives of it are trivially computed with simple logical gates.

VIII: Multiplication by AND'ing two Pulse Trains

Another component of Back Propagation is the manner in which the weights are updated. This is (essentially):

$$\frac{dw_{ji}}{dt} = \text{Output}_{Below} \times \text{Error}_{Above} \quad (83)$$

If the error in a node above is reprsented in a spike method, the calculation for the change of the weights is simple. It is (essentially) the logical AND of the forward flowing spiked data signal and the spiked error signal.

If all signals in the network are represented as spikes, much of the noise problems associated with pure analog signals is alleviated.

Figure 6:
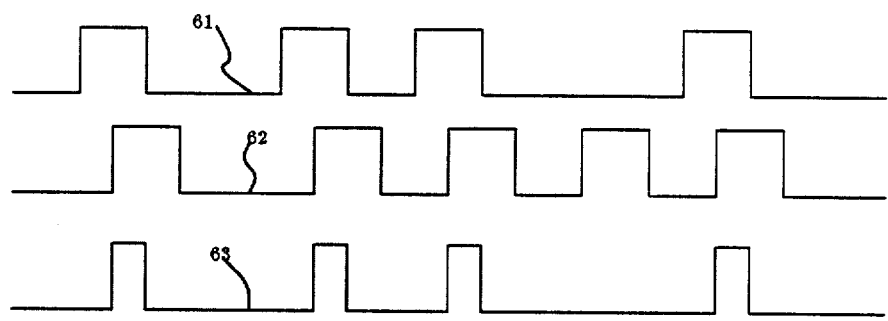
FIG. 6 illustrates two signals being logically AND'ed together.

FIG. 6 illustrates the logical AND of two spike trains. Signal traces 61 and 62 depict typical input signals. Signal trace 63 is the logical AND of the two input signals 61 and 62. Under the right circumstances, the logical AND of two spiked signals is equivalent to the multiplication of the two signals.

To show this, assume that each line $i = 1,2$ has a probability $P_i$ that it is a one. Since the logical AND of two lines is one only when both input lines are one, from simple statistics, the porbability that an output line is one is $P_1 \times P_2$. It is clear to see that an input line will have a probability of being one in proportion to the frequency on the line if the width of the pulse remains constant. This is the method used in the circuits derived herein. The output therefore will have a probability of being a one which is proportional to the multiplication of the probabilities of the two input lines.

Hence, to multiply the Data and Error signals, when the spike model is used, all that is required is a trivial AND gate. By averaging the output of the AND gate over time, a true multiplication is performed.

IX: Rederivation of Back Propagation

Prior art Back Propagation sums the excitatory and inhibitory (positive and negative) weights together, and there is only a single NetData which drives the squash function. The Spike Model of this invention seperates the excitatory and inhibitory weights into two catagories, and since it has a two-parameter squash function, it is necessary to rederive a few equations of the traditional Back Propagation utilizing the new function.

The basic rule for modifying weights remains the same as in traditional Back Propagation:

$$\frac{dw_{ji}}{dt} = -\frac{\partial E}{\partial w_{ji}} \quad (84)$$

For brevity, let $\gamma_{pj} \equiv \partial E/\partial o_{pj}$. Since weights can now be thought of as either excitatory or inhibitory, equation 84 can be re-written by denoting an excitatory weight as $w_{ji}^+$ and an inhibitory weight as $w_{ji}^-$:

$$\frac{dw_{ji}^+}{dt} = \frac{\partial E}{\partial w_{ji}^+} \tag{85}$$

$$= \frac{\partial E}{\partial o_{pj}} \frac{\partial o_{pj}}{\partial net_{pj}^+} \frac{\partial net_{pj}^+}{\partial w_{ji}^+} \tag{86}$$

$$= \gamma_{pj} f'_{net+}(net_{pj}^+, net_{pj}^-) o_{pi} \tag{87}$$

$$\frac{dw_{ji}^-}{dt} = \frac{\partial E}{\partial w_{ji}^-} \tag{88}$$

$$= \frac{\partial E}{\partial o_{pj}} \frac{\partial o_{pj}}{\partial net_{pj}^-} \frac{\partial net_{pj}^-}{\partial w_{ji}^-} \tag{89}$$

$$= \gamma_{pj} f'_{net-}(net_{pj}^+, net_{pj}^-) o_{pi} \tag{90}$$

The update of the excitatory and inhibitory weights are identical, except for which partial derivative of the squash function f is in the node above. Both use the same net error ($\gamma_{pj}$). Both use the same data from the lower node ($o_{pi}$).

The computation of the net error ($\gamma_{pj}$) in hidden nodes is altered. The rederivation is as follows:

$$\gamma_{pi} = \frac{\partial E}{\partial o_{pi}} \tag{91}$$

$$= \sum_{j^+} \frac{\partial E}{\partial o_{pj}} \frac{\partial o_{pj}}{\partial net_{pj}^+} \frac{\partial net_{pj}^+}{\partial o_{pi}} + \tag{92}$$

$$\sum_{j^-} \frac{\partial E}{\partial o_{pj}} \frac{\partial o_{pj}}{\partial net_{pj}^-} \frac{\partial net_{pj}^-}{\partial o_{pi}}$$

$$= \sum_{j^+} \gamma_{pj} f'_{net+}(net_{pj}^+, net_{pj}^-) w_{ji}^+ + \tag{93}$$

$$\sum_{j^-} \gamma_{pj} f'_{net-}(net_{pj}^+, net_{pj}^-) w_{ji}^-$$

The above derivations are sufficient to demonstrate the feasibility of the other derivations in this disclosure.

X: Back Propagation Implementation

The Spike Model Back Propagation Neural Network as developped and disclosed herein is readily implemented in hardware. There exist many methods to create a hardware environment for this version of the algorithm. Two exemplary circuits will be examined. A Type I Back Propagation Neural Network uses spikes trains for the forward data flow and an analog signal is used for the backwards flow of error information. These signals are multiplexed onto the same data line. The Type II Back Propagation Neural Network uses spike trains for both the forwards and backwards flow of information.

The Back Propagation algorithm, when implemented in the Spike Model specifies the following equations are to be performed in what can be called a nonlinear bidirectional matrix multiplier:

$$RawData_j = f_1\left(\sum_i Data_i \times w_{ji}\right) \tag{94}$$

$$RawError_i = f_2\left(\sum_j Error_j \times w_{ji}\right) \tag{95}$$

$$\frac{dw_{ji}}{dt} = Error_j \times Data_i \tag{96}$$

The functions $f_1$ and $f_2$ are the intrinsic functions created by the hardware instantiations. As was shown, $f_1$ (for the forward flow of data information) can be made to perform the essential characteristics of the squash function, by OR'ing the spike pulses together. On the other hand, anything other than a linear $f_2$ (for the backwards flow of error information), will cause problems (or the necessity to create an inverse function).

Equations 94 and 95 define two matrix multiplications. A vector of data signals is multiplied by a weight matrix to provide a vector of net data signals, whose elements are then individually "squashed" to create a new set of data signals. Similarly, a vector of error signals are multiplied by the same weight matrix (after it has been inverted) to provide a vector of net error signals. If $f_2$ is linear, then no squashing of this net error vector takes place. Equation 96 defines how the weight is to be changed. The functions associated with a single element in the matrix are grouped together and are collectively called a matrix element. Together, they form the non-linear bidirectional matrix multiplier. This will become more clear as the hardware implementations are explained.

It still remains that there needs to be a function which converts the RawData and RawError values into the Data and Error values. One cannot directly forward the information, because the colliding spikes of the RawData signal will not be of a reasonable form. It is possible that the RawError signal can be passed directly, in some circuit designs (i.e. if the passage of information is linear enough and the format is correct for the lower layers). However, since the number of these elements which must be physically instantiated is much smaller than the number of interconnections, it behooves the designer to select the smallest design possible for the interconnections.

For simplicity when labelling wires in the hardware version, new names will be given to the elements in the Back Propagation algorithm. The names Data and Error indicate that the lines generally communicate the obvious information. When applicable, the name Positive Error indicates that the line transmits the positive portion of the Error signal. The negative portion of the Error signal is transmitted by the line Negative Error. To derive the total error signal, some combination of the previous lines is necessary (such as summation).

Figure 7:
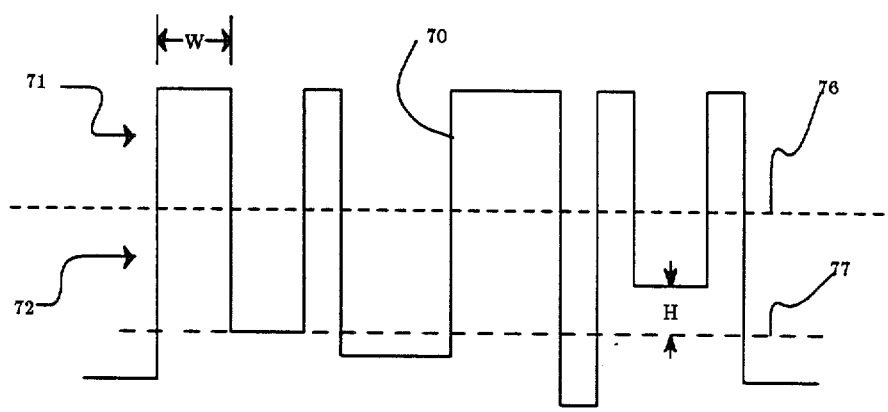
FIG. 7 illustrates a typical signal on a combining line of a type I circuit.

FIG. 7 depicts a stereotypical trace 70, of a multiplexed data and error signal having an upper half, denoted generally as 71 and a lower half, denoted generally as 72, seperated by midline 76. The data signal is present on the upper half of the trace. The magnitude of the data value is represented by and equivalent to the duty cycle of the data pulses. The duty cycle is the time (width) W of a spike, divided by the total time (width) between the start of two spikes. Hence, the value of the duty cycle varies between 0 and 1. The error signal is present on the lower half of the trace. The magnitude of the error value is represented by and equivalent to the height H of the signal pulses from a reference level, depicted by line 77. Note: if the signal pules goes below line 77 that the represented error signal is negative.

XI: Type I Back Propagation Neural Network

Figure 8A:
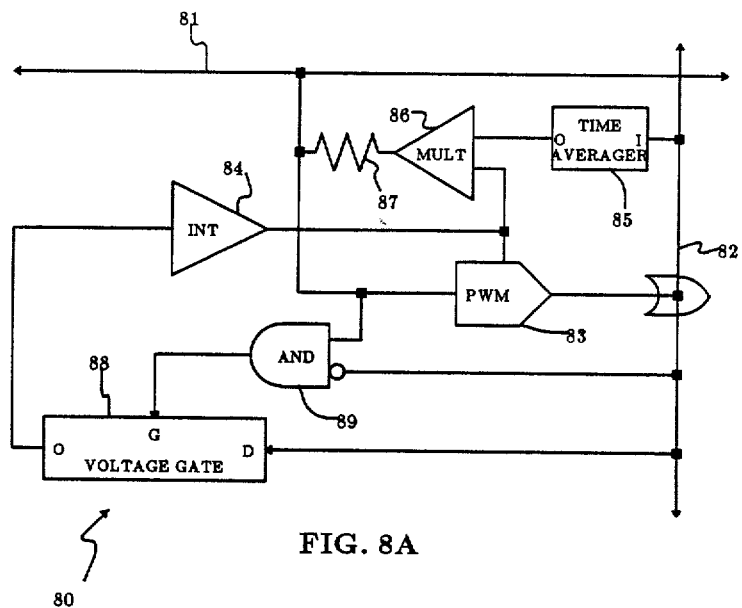
FIG. 8a is a block circuit diagram of a type I matrix element.
Figure 8B:
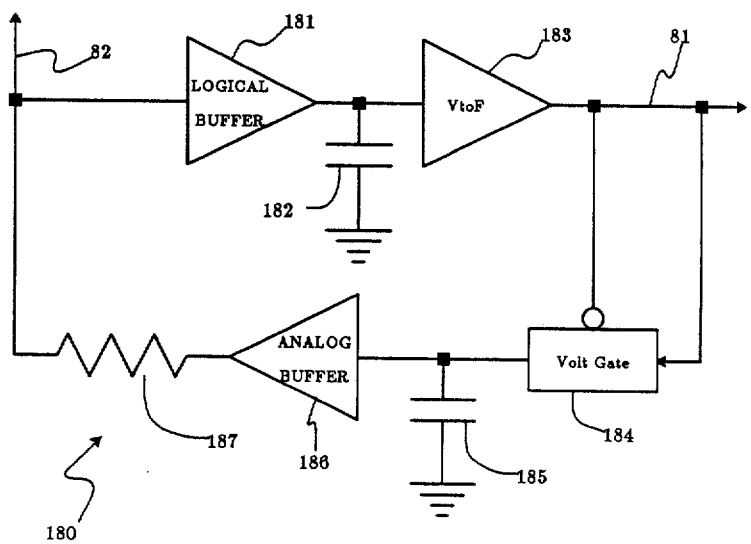
FIG. 8b is a block circuit diagram of a type I processing element.

FIGS. 8a and 8b depict a set of circuits which can perform Back Propagation utilizing the Spike Model of this invention. This implementation version shall be called Type I. FIG. 8a is a representative circuit for a Type I matrix element, denoted generally as 80. FIG. 8b is a representative circuit for a Type I processing element, denoted generally at 180. As in the previous Type 0 model, these elements 80, 180 can be arranged similar to the configuration of FIG. 2, with Type I matrix elements 80 in place of matrix elements 10, and Type I processing elements 180 in the place of Processing Elements 20.

Horizontal combining element line 81 is directly connected to one processing element and one or more matrix elements 80. The forward flow of data on line 81 is in the form of spikes with their frequency being the value of the activation level of the connected processing element. The width of the data spikes is small and is used to control the learn rate, the details and implementation of which are not discussed in this disclosure. During the off-time of the data spikes, the net error value is propagated as an analog value measured from some reference value as is illustrated and described in reference to FIG. 7.

Vertical combining element line 82 is connected to one or more matrix elements and to only one processing element. Line 82 carries a multiplexed net data spike train signal forward and an analog error signal backwards. This error signal on line 82 is present during the off-time of the data spike, similar to that shown as trace 70 of FIG. 7.

Figure 2:
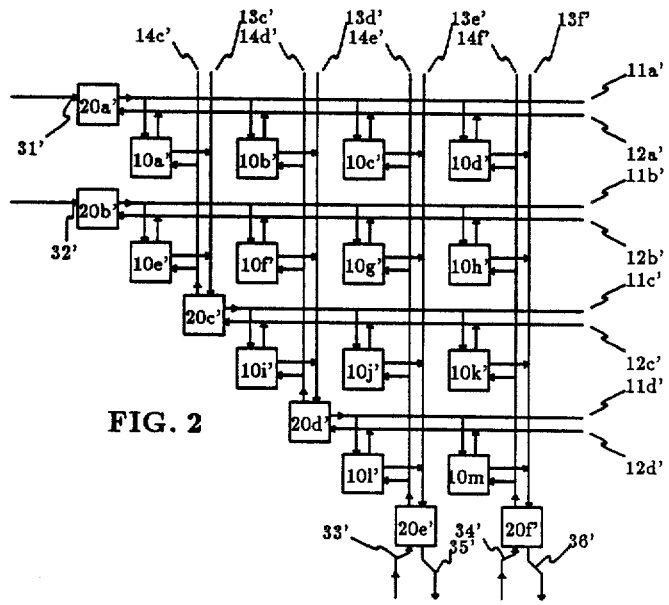
FIG. 2 is a diagrammatic matrix representation of the Network of FIG. 1.
Figures 3A, 3B:
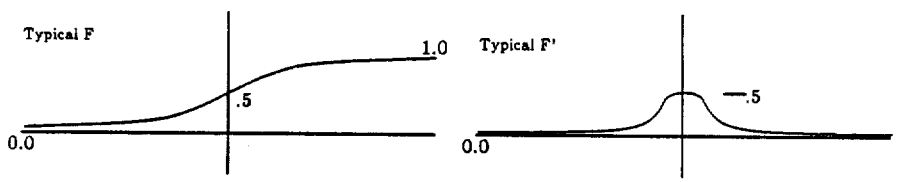

Because the data and error signals are multiplexed on a single line in the Type 1 Back Propagation Neural Network, line 81 carries information equivalent to the information carried on lines 11, 12 of FIG. 2 and line 82 carries information equivalent to the information carried on lines 13, 14 of FIG. 2.

The Type I matrix element circuit of FIG. 8a works as follows. To pass the data information forward through type I matrix element 80 the PWM element 83 has as inputs line 81 and the weight value output of integrator 84. Whenever a data pulse on line 81 transistions upwards, PWM 83 fires for a duration dependent upon the value of the weight received from integrator 84. The output of PWM 83 is "OR'"ed onto line 82, such as by simply connecting it to the line.

It is important to note that the OR'ing of the spiked output data information onto line 82 by all of the matrix elements connected to that line accomplishes the squash function as discussed previously in relation to equation 46.

To send the analog error signal received on line 82 backwards, error averager 85 samples the error signal on line 82 and outputs an average of it. Error averager 85, when no error signal is present on line 82 (i.e. when an OR'ed forward data pulse is present), assumes a value of zero error. By doing so, the product of the error times the derivative of the squash function is performed. Multiplier 86 receives the average error from error averager 85 and the weight from integrator 84, and multiplies them, and outputs the product via a summation onto line 81 through resistor 87. Resistor 87 is overpowered when a data spike is present, such that the error value does not effect any change on a data spike.

The matrix element 80 depicted in FIG. 8a is representative of a hidden matrix element. Input matrix elements are those connected directly to an input processing element, e.g. matrix elements 10a', 10b', 10c', 10d', 10e', 10f, 10g' and 10h' of FIG. 2. Input matrix elements do not need means for the back propagation of weighted error.

The following circuit produces the weight update signal. Voltage gate 88 has input D connected to line 82 and input G connected to the output of AND gate 89. Voltage gate 88 turns on when input G is high, i.e., it passes the error voltage from D through to output O. AND gate 89 has one input connected to line 81. This input is high only during the on-time of forward data spikes. Since the width of the forward data spikes corresponds to the learn rate, the on-time of AND gate 89 varies accordingly. The other input to AND gate 89 is inverted and is connected to line 82. Thus this line is high when the error value (low) is on line 82. The resultant output of Voltage Gate 88, is equivalent to dw/dt, which is the time-averaged equivalent of $learn\_rate \times f'(net\_data) \times error_{above} \times output_{below}$.

Integrator 84 receives as input the output O of Voltage Gate 88. Integrator 84 integrates this signal over time. The output of integrator 84 is the weight value for matrix element 80.

The Type I processing element 180 depicted in FIG. 8b works as follows. For the forward flow of data logical buffer 181 receives from line 82 the multiplexed Data and Error Signals and strips out the error signal by turning that time period into a true zero value. The output of logical buffer 181 is time averaged, such as by capacitor 182. The time averaged signal is received by Voltage to Frequency element 183 which converts the time averaged signal into a pulse train, and presents that as output on line 81.

For the backwards flow of error information through Type I processing element 180, voltage gate element 184 samples the error signal available on line 81 when no data signal is present by allowing the voltage present on line 81 through as output when line 81 is not high. Capacitor 185 time averages this output signal. Analog buffer 186 receives this time averaged error signal and provides it to resistor 187. Resistor 187 is overpowered when a forward data pulse is presented on line 82 by a matrix element. When no data pulse is present on line 82., Resistor 187 provides a backwards error signal on line 82 to the matrix elements connected on line 82.

Processing element 180 is representative of a hidden processing element for a Type 1 Back Propagation neural network. The input and output Processing Elements may vary somewhat depending on the desired from of the input, output and error vectors. Particularly, the input processing elements could exclude the means for the backward flow of error information.

The major benefit of these circuits is that only one wire is needed for communications (as opposed to two, one for data and one for error, as shown in FIGS. 1 and 2). In VLSI architectures, where the the number of pins (wires going on and off of a chip) on a single Chip is critical, this can be very benificial. The main detraction is that this circuit is susceptible to noise in the one area in which noise is extremely harmful, i.e., in the analog error signal which must be kept relatively small compared to the total range of voltages so that it can always be distinguished from the data signal. Thus, there is little margin for noise immunity.

XII: Type II Back Propagation Neural Network

Figure 9A:
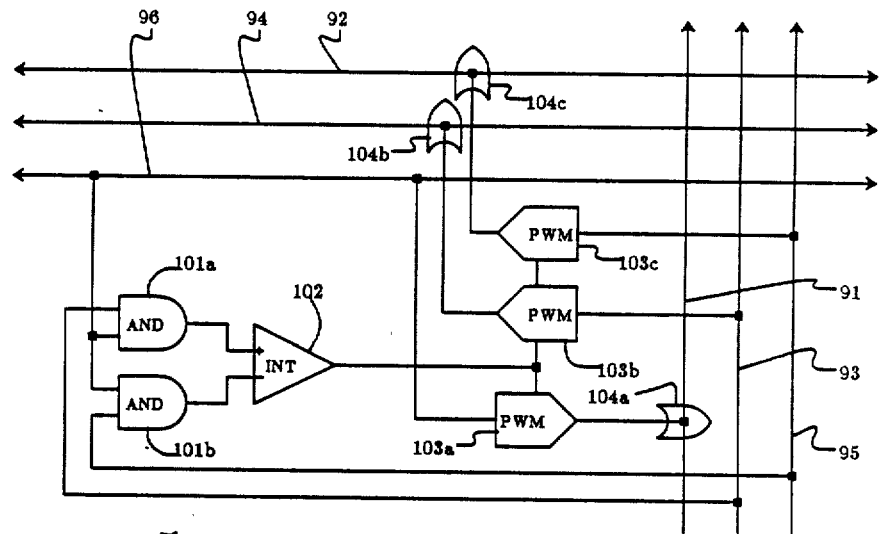
FIG. 9a is a block circuit diagram of a type II matrix element.
Figure 9B:
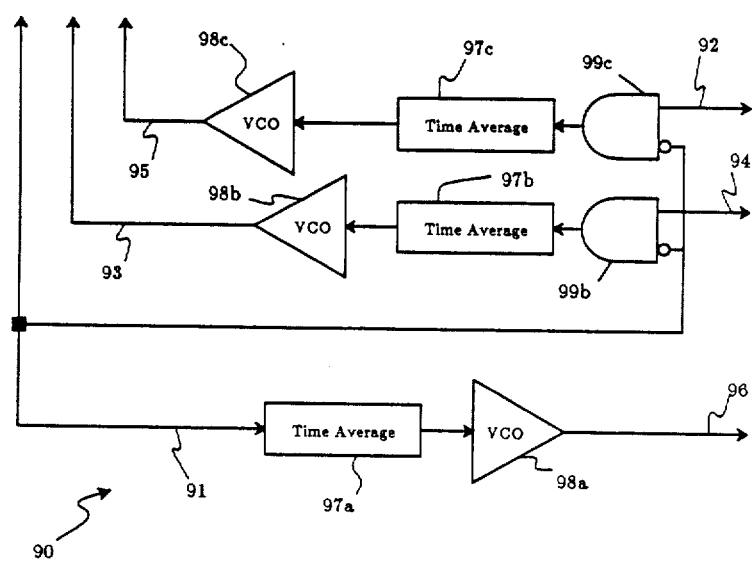
FIG. 9b is a block circuit diagram of a type II processing element.

FIGS. 9a and 9b together depict the Type II Back Propagation Neural Network circuit which uses spike trains for both for the forward flow of data information and the backwards flow of error information. FIG. 9a is a block diagram of an exemplary Type II hidden matrix element, denoted generally as 190. FIG. 9b is a block diagram of an exemplary Type II hidden processing element, denoted generally as 90. As with the previously discussed Type 0 and Type 1 matrix elements and processing elements, the Type II elements can be arranged similar to the arrangement of FIG. 2 (or expanded) to form a neural network. Processing element 90 and matrix element 190 are representative of Type II hidden elements. Type II input and output elements will vary in obvious manners from the hidden elements described.

As before, the components of elements, particularly at the input and output levels will vary according to the desired input, output and error vectors. Lines 92, 94 and 96 connect one processing element below to one or more matrix elements above it. Lines 91, 93 and 95 connect one processing element above to one or more matrix elements that provide data to that processing element.

The spikes utilized in this circuit are not signed (i.e. the are positive going only). Two lines are used for backwards propagation of error signals. One is used for positive error, and the other is used for negative error signals. The Matrix Element Type II produces two raw pulsed error signals, one a positive and the other a negative. The Processing Element converts these signals into Positive Pulsed Error and Negative Pulsed Errors signals.

In FIG. 9a, forward flow of data information through matrix element type II 190 is identical to that in Matrix Element Type I. Pulsed data on pulsed data line 96 is received by PWM element 103a which also receives a weight value from integrator element 102. The output of PWM element 103a is OR'ed onto raw pulsed data line 91 by psuedo-element 104a as a portion of the raw squashed data signal.

However, the backwards flow of error information is simplified, because instead of multiplexing both error signs on a single line, they are significantly separated. Ideally, whenever the error is positive, the error is fed down Positive Pulsed Error line 93, and correspondingly, a negative error is fed down Negative Pulsed Error line 95. In some implementations, lower layers of the network may have both positive and negative errors present, because the error signals are not cancelled. When this happens, a simple cancellation circuit can be used to discern the difference and leave only one signal with active information.

For the backwards propagation of error information through matrix element type II, the pulsed error has a positive portion on Positive Pulsed Error line 93 and a negative portion on Negative Pulsed Error line 95. PWM elements 103b and 103c receive input from lines 93 and 95 respectively. PWM elements 103b and 103c both receive as weight input the weight output value from integrator element 102. Outputs from PWM elements 103b and 103c are wire-OR'ed onto Positive Raw Pulsed Error line 94 and Negative Raw Pulsed Error line 92 by psuedo-elements 104b and 104c respectively.

The weight value generated by integrator element 102 is updated by its two input signals: a positive update signal generated by AND element 101a, and a negative update signal generated by AND element 101b. The inputs of AND element 101a are pulsed data line 96 and positive pulsed error line 93. The inputs of AND element 101b are the pulsed data line 96, and negative pulsed error line 95. Integrator means, such as integrator element 102, takes its positive and negative inputs, calculates the difference between them and provides as weight output the integration over time of that calculated difference.

FIG. 9b depicts a Type II Processing Element, denoted generally as 90. For the forward flow of data information through processing element 90, time averaging element 97a receives the squashed data from raw pulsed data line 91. and provides as output the average value of that signal over time. A time averaging element may be as simple as an ordinary capacitor, but may include a logical buffer, to clean the signals up into desired discrete boolean values. Voltage to Frequency element 98a recieves the output of time averaging element 97a and provides output to pulsed data line 96 as a pulsed data signal at a frequency linearly proportional to the output of time averageing element 97a.

For the backwards flow of error information through processing element 90, AND elements 99b and 99c receive the error information for positive raw pulsed error line 94 and Negative Raw Pulsed Error line 92, respectively. Also, AND elements 99b and 99c recevie the complement of the forward flowing squashed data from Raw Pulsed Data line 91. This has the effect of time-multiplying the feedback error by the derivative of the squash function. The outputs of AND elements 99b and 99c are fed into time averaging elements 97b and 97c respectively. The outputs of time averaging elements 97b and 97c are fed into the inputs of Voltage to Frequency elements 98b and 98c respectively. The outputs of Voltage to Frequency elements 98b and 98c are fed onto positive pulsed error line 93 and negative pulsed error line 95, respectively, as pulsed data output signals.

An offset problem may occur if the widths of the Positive and the Negative Pulsed Error lines are not identical. If one is longer than the other, there will be an offset towards that direction. This may or may not be a significant problem under various circumstances.

Figure 9C:
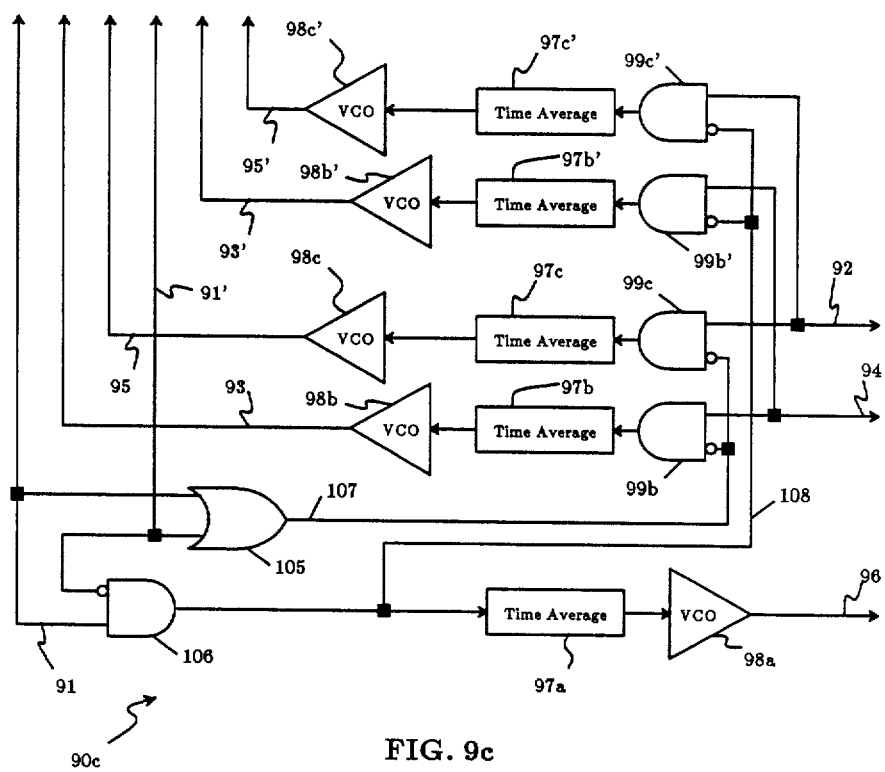
FIG. 9c is a block circuit diagram of a type II processing element that accepts both excitatory and inhibitory data pulses.

FIG. 9c depicts an expansion of a Type II Processing Element, denoted generally as 90c. Processing element 90c is for use in a modified Type II back propagation neural network, in which weights values may be effectively both positive and negative. The matrix elements in this system may be thought of as a pair of matrix elements one inhibitory, one excitatory. An excitatory matrix element would be similar to matrix element 190, and would be connected to lines 91, 93 and 95, and would output a excitatory raw pulsed data output signal onto line 91. An inhibitory matrix element is modified such that element 104b is connected to line 92 and element 104c is connected to line 94. This would then send the error back with the opposite sign, as is necessary. An inhibitory matrix element would be connected to lines 91', 93' and 95', and output an inhibitory raw pulsed data output signal onto line 91'.

For the forward flow of data information through processing element 90c, AND element 106 receives the excitatory squashed data from Excitatory Raw Pulsed Data line 91 and the complement of the inhibitory squashed data from Inhibitory Raw Pulsed Data from line 91', and AND's the two signals together, providing the results on line 108. Time averaging element 97a receives this AND'ed signal from line 108 and provides as output the average of that signal over time. Voltage to Frequency element 98a receives the output of time averaging element 97a and provides output to Pulsed Data line 96.

For the backwards flow of error information through processing element 90c, to the excitatory inputs, AND elements 99b and 99c receive the error information from Positive Raw Pulsed Error line 94 and Negative Raw Pulsed Error line 92, respectively. OR gate 105 receives as input the excitatory squashed data from Excitatory Raw Pulsed Data line 91 and the inhibitory squashed data from Inhibitory Raw Pulsed Data from line 91'. OR gate 105 produces an OR'ed signal on line 107. AND elements 99b and 99c further receive the complement of the OR'ed signal on line 107. This has the effect of time-multiply'ing the feedback error by the derivative of the squash function with respect to the excitatory raw squashed data. The outputs of AND elements 99b and 99c are fed into time averaging elements 97b and 97c respectively. The outputs of time averaging elements 97b and 97c are fed into the inputs of Voltage to Frequency elements 98b and 98c respectively. The outputs of Voltage to Frequency elements 98b and 98c are fed onto Positive Pulsed Error line 93 and Negative Pulsed Error line 95, respectively.

For the backwards flow of error information through processing element 90c, to the inhibitory inputs, AND elements 99b' and 99c' receive the error information from Positive Raw Pulsed Error line 94 and Negative Raw Pulsed Error line 92, respectively. Also, AND elements 99b' and 99c' receive the complement of the AND'ed signal from line 107. This has the effect of time-multiply'ing the feedback error by the derivative of the squash function with respect to the inhibitory raw squashed data. The outputs of AND elements 99b' and 99c' are fed into time averaging elements 97b' and 97c' respectively. The outputs of time averaging elements 97b' and 97c' are fed into the inputs of Voltage to Frequency elements 98b' and 98c' respectively. The outputs of Voltage to Frequency elements 98b' and 98c' are fed into Positive Pulsed Error line 93' and Negative Pulsed Error line 95', respectively.

XIII: Why This Is Better

From the foregoing description, it is seen that the spike system of Back Propagation of the present invention avoids the major problem of offset errors inherent in a straight analog system.

In a time-multiplication, as is used in this invention, the offset is limited by the resolution of the time-values, rather than by the matching of components. This resolution of the time values, rather than adding a constant offset, is like multiplying in a constant; that is not bad in the back propagation algorithm, as it primarily affects the learn-rate, which has been shown to be allowed to be variable by weight.

Other major benefits of the spike system include a dramatic reduction in the number of components necessary to implement the system; no four-quadrant multipliers are necessary; no active elements which perform squash or squashprime functions; and offset noises are not present.

Although the invention has been shown and described with reference to cetain specific embodiments, it is to be understood that this matter is to be interpreted as illustrative and not in any limiting sense, and that many modifications and substitutions will become apparent to those skilled in the art. For example, it should be readily apparent that optical systems will be greatly enhanced through the use of these multiplicative mechanisms, as there exists no way, currently, to produce the analog multiplication of two light signals, but the OR'ing of two light signals is readily feasible. Also, it is possible to modify the Type II circuitry to have a single backwards error spike pulse, and another line represent the sign, or to use a positive going spikes and negative going spike on the same line, etc. This disclosure is intended to cover in the appended claims such modifications and changes as come within the true spirit and scope of the invention.

What I claim is:

1. A neural network for receiving an input vector comprised of input vector elements, each representing an input vector element value, and, in response thereto and as a function thereof, for outputting a network output value; said network comprising:
   a plurality of matrix elements, corresponding in number to the number of elements in the input vector, each comprising:
      means for receiving a corresponding element of the input vector as an input data value;
      duty cycle conversion means
         for receiving said input data value, and
         for producing an output data signal, said output data signal being a pulse train whose duty cycle is proportional to said input data value; and
      means for transmitting said output data signal; and
   a combining element, comprising:
      means for OR'ing said output data signals from said matrix elements to produce a raw squashed data output signal; and
      means for transmitting said raw squashed data output signal as said network output value.

2. The neural network of claim 1, wherein said matrix elements further comprise:
   weight value means for providing a weight value; and
   wherein said duty cycle conversion means receives said weight value, and
   wherein the duty cycle of said output data signal is proportional to the product of said input data value and said weight value.

3. The neural network of claim 2,
   wherein the received input vector elements are in the form of pulse trains with the corresponding input vector values being represented by the frequency of the pulse trains; and
   wherein the frequency of said output data signal of said duty cycle conversion means is equal to the frequency of the input vector element pulse train and
   wherein the width of a pulse of said output data signal is proportional to said weight value.

4. A neural network for receiving an input vector comprised of input vector elements, each representing an input vector value, and, in response thereto and as a function thereof, for outputting a network output value; said network comprising:
   a plurality of matrix elements, corresponding in number to the number of elements in the input vector, each comprising:

means for receiving a corresponding element of the input vector as an input data value;

duty cycle conversion means for receiving said input data value, and for producing an output data signal, said output data signal being a pulse train whose duty cycle is proportional to said input data value; and means for transmitting said output data signal;

a combining element, comprising:

means for OR'ing, said output data signals from said matrix elements to produce a raw squashed data output signal; and means for transmitting said raw squashed data output signal; and an output layer comprising:

an output processing element, comprising:

averaging means for receiving said raw squashed data output signal; and for producing, as the network output value, an output data signal which is the time average of said raw squashed data output signal.

5. The neural network of claim 4, wherein said matrix elements further comprise:

weight value means for providing a weight value; and wherein said duty cycle conversion means receives said weight value, and wherein said duty cycle of said output data signal is proportional to the product of said input data value and said weight value.

6. The neural network of claim 5, wherein the received input vector elements are in the form of pulse trains with the corrseponding input vector values being represented by the frequency of the pulse trains; and wherein the frequency of said output data signal of said duty cycle conversion means is equal to the frequency of the input vector element pulse train and wherein the width of a pulse of said output data signal is proportional to said weight value.

7. A back propagation neural network receiving an input vector comprised of input vector elements, each representing an input vector element value, for receiving an error vector element as an error vector element value, and, in response thereto and as a function thereof, for outputting a network output value;

said network comprising:

a plurality of matrix elements, corresponding in number to the number of elements in the input vector, each comprising:

means for receiving a corresponding element of the input vector as an input data value;

weight value means for providing a weight value;

means for receiving an error value from a combining element;

duty cycle conversion means for receiving said input data value, for producing an output data value dependent on said input data value, for receiving said weight value, for producing an output data signal as a pulse train whose duty cycle is proportional to the product of said input vector value and said weight value;

means for transmitting said output data signal; and weight update means for producing a weight update value as a function of said error value and said input data value; and for combining said weight update value with said weight value to produce an updated weight value for said weight value means;

a combining element, comprising:

means for receiving said output data signals from said matrix elements;

means for OR'ing said output data signals to produce a raw squashed data output signal;

means for transmitting said raw squashed data output signal; and means for receiving an error value from an output processing element and distributing it to said matrix elements;

an output layer comprising:

an output processing element, comprising:

averaging means for receiving said raw squashed data output signal, and for producing, as the network output vector, an output data signal which is the time average of said raw squashed data output signals;

error receiving means for receiving an error vector element value;

error conversion means for producing an error value which is a function of said error vector element value; and error transmission means for transmitting said error value.

8. The network of claim 7, wherein said weight update value produced is the product of said error value and said input data value, averaged over the time when no pulses are present in said raw squashed data output signal.

9. The network of claim 7, wherein said combining element is implemented as multiple transmission lines; and wherein said raw squashed data signal and said error value are transmitted seperately on seperate transmission lines.

10. The network of claim 9, wherein said error value is transmitted during the time when no pulses from said raw squashed data signal are present on said transmission lines.

11. The network of claim 7, wherein said combining element includes transmission lines and said raw squashed data signal and said error value are multiplexed onto said transmission lines.

12. A back propagation neural network for receiving an input vector comprised of input vector elements, each representing an input vector element value;

for receiving an error vector comprised of one or more error vector elements, each representing an error vector element value;

and, in response thereto and as a function thereof, for transmitting an output vector comprised of one or more output vector elements, corresponding in number to the number of error vector elements, each representing an output vector element value;

said network comprising:

a processing element input layer comprising:

a plurality of input processing elements, corresponding in number to the number of input vector elements, one input processing element being associated with each input vector element;

each input processing element being associated with a particular input layer horizontal combining element means;

each input processing element including:
  means for receiving said input processing element's associated input vector element value and
  means for transmitting a data signal which is a function of said input processing element's associated input vector element value to said input processing element's associated input layer horizontal combining element means;

a processing element hidden layer comprising:
at least one hidden processing element,
each hidden processing element
  being associated with a particular vertical combining element means; and
  being associated with a particular hidden layer horizontal combining element means;
each hidden processing element comprising:
  forward data propagation means including:
    means for receiving a squashed data signal from said hidden processing element's associated vertical combining element means; and
    for transmitting to said hidden processing element's associated hidden layer horizontal combining element means a data signal which is a function of said received squashed data signal; and
  error back propagation means including:
    means for receiving a combined error signal from said hidden processing element's associated hidden layer horizontal combining element means;
    means for receiving a squashed data signal from said hidden processing element's associated vertical combining element means;
    means for producing a feedback error value which is a function of said combined error signal and said squashed data signal; and
    means for transmitting said feedback error value to said hidden processing element's associated vertical combining element means;

a processing element output layer comprising:
  one or more output processing elements, corresponding in number to the number of error vector elements, one output processing element being associated with each error vector element,
  each output processing element being associated with a particular vertical combining element means,
  each output processing element comprising:
    forward data propagation means comprising:
      means for receiving a squashed data signal from said output processing element's associated vertical combining element means; and
      means for transmitting an output vector element value which is a function of said squashed data signal; and
    backwards error propagation means including:
      means for receiving an error vector element value;
      means for producing a feedback error value which is a function of said error vector element value; and
      means for transmitting said feedback error value to said output processing element's associated vertical combining element means;

a plurality of input matrix elements,
  each forming a data flow coupling path between an input layer horizontal combining element means and a vertical combining element means;
  there being at least one input matrix element coupled to each input layer horizontal combining element;
  each input matrix element comprising:
    weight value means for providing a weight value;
    forward data propagation means including
      means for receiving said data signal from said input matrix element's associated input layer horizontal combining element means;
      means for receiving said weight value from said input matrix element's said weight value means;
      duty cycle conversion means for producing a weighted data signal as a pulse train whose duty cycle is proportional to the product of said data signal and said weight value; and
      means for transmitting said weight data value to said input matrix element's associated vertical combining element means; and
    weight update means including:
      means for receiving said data signal from said input matrix element's associated input layer horizontal combining element means;
      means for receiving a feedback error value from said input matrix element's associated vertical combining element means;
      means for producing a weight update value as a function of said feedback error value and said pulse data signal; and
      means for combining said weight update value with said weight value to produce an updated weight value;

one or more hidden matrix elements,
  each forming a data flow coupling path between a hidden layer horizontal combining element means and a vertical combining element means;
  at least one hidden matrix element being associated with each hidden layer horizontal combining element;
  at least one input matrix element or one hidden matrix element being associated with each vertical combining element;
  each said hidden matrix element comprising:
    weight value means for providing a weight value;
    forward data propagation means including
      means for receiving said data signal from said hidden matrix element's associated hidden layer horizontal combining element means;
      means for receiving said weight value from said hidden matrix element's said weight value means;
      duty cycle conversion means for producing a weighted data signal as a pulse train whose duty cycle is proportional to the product of
said data signal and said weight value; and
means for transmitting said weight data value
to said input matrix element's associated
vertical combining element means;
weight update means including:
means for receiving said data signal from said
hidden matrix element's associated hidden
layer horizontal combining element means;
means for receiving a feedback error value
from said hidden matrix element's associated vertical combining element means;
means for producing a weight update value as
a function of said feedback error value and
said pulse data signal; and
means for combining said weight update value
with said weight value to produce an updated weight value; and
weighted backward error propagation means
including:
means for receiving a feedback error value
from said hidden matrix element's associated hidden layer horizontal combining element means;
means for producing a weighted feedback
error value as a function on said weight
value and said received feedback error
value; and
means for transmitting said weighted feedback
error value to said hidden matrix element's
associated vertical combining element
means;
a plurality of vertical combining element means,
each being associated with
a single processing element, and
one or more matrix elements;
each vertical combining element means comprising:
means for OR'ing said pulsed weighted data
signals received from said vertical combining
element's said associated matrix elements to
produce a raw squashed data output signal;
means for transmitting said raw squashed data
output signal to said vertical combining element's associated processing element;
means for receiving said feedback error value
from said vertical combining element's associated processing element; and
means for distributing said feedback error value
to said vertical combining element's associated
matrix elements.
a plurality of hidden layer horizontal combining element means,
each being associated with
a single hidden processing element, and
one or more hidden matrix elements,
each hidden layer horizontal combining element
means comprising:
means for receiving said data signal from said
hidden layer horizontal combining element's
said associated hidden processing element;
means for transmitting said data signal to said
hidden layer horizontal combining element's
said associated hidden matrix elements;
means for receiving said feedback error values
from said hidden layer horizontal combining
element's said associated hidden matrix elements;

means for producing a combined error value
which is a function of said feedback error
values; and
means for transmitting said combined error value
to said hidden layer horizontal combining
element's associated hidden processing element; and
a plurality of input layer horizontal combining element means,
each being associated with
a single input layer processing element, and
one or more input matrix elements;
each input layer horizontal combining element
means comprising:
means for receiving said data signal from said
input layer horizontal combining element's
said associated input layer processing element;
and
means for transmitting said data signal to said
input layer horizontal combining element's
said associated input matrix elements.
13. The neural network of claim 12, wherein:
said data signal transmitted from each said input processing element is in the form of a pulse train, the
frequency of said pulse train being a function of
said corresponding input vector element value;
wherein said weighted data signal of said input
matrix element's duty cycle conversion means
has a frequency equal to said frequency of its said
received data signal from said input vector element pulse train; and
wherein said pulses of said weighted data signal of
said input matrix elements has a width proportional to said weight value.
14. The neural network of claim 12, wherein said
vertical combining element means comprises a plurality
of transmission lines and wherein said raw squashed
data output signal and said feedback error value are
transmitted on separate transmission lines.
15. The neural network of claim 12,
said backwards error propagation means of an output
processing element further includes:
means for receiving a squashed data signal from
said output processing element's associated vertical combining element means; and
wherein said feedback error value, produced by
said means for producing a feedback error value,
is also a function of said squashed data signal.
16. The neural network of claim 15, wherein:
said feedback error value, produced by said means for
producing a feedback error value of said backwards error propagation means of an output processing element, is proportional to the product of
the off-time of said error vector element value and
said error vector element value.
17. The neural network of claim 12,
said backwards error propagation means of an output
processing element further includes:
means for receiving a squashed data signal from
said output processing element's associated vertical combining element means; and
wherein said feedback error value, produced by
said means for producing a feedback error value,
is also a function of said squashed data signal.
18. The neural network of claim 17, wherein:
said feedback error value, produced by said means for
producing a feedback error value of said backwards error propagation means of an output processing element, is proportional to the product of the off-time of said error vector element value and said error vector element value.

19. The neural network of claim 12, wherein each said vertical combining element means includes a transmission line and said raw squashed data output signal and said feedback error value are multiplexed onto said transmission line.

20. The neural network of claim 19, wherein said feedback error value is transmitted during the off-time of said raw squashed data signal.

21. A neural network for receiving an input vector comprised of input vector elements, each representing an input vector element value, and, in response thereto and as a function thereof, for outputing a network output value;

said network comprising:
- a plurality of excitatory matrix elements, corresponding in number to the number of input vector elements, one excitatory matrix element being associated with each input vector element, each excitatory matrix element comprising:
  - means for receiving a corresponding input vector element as an input data value;
  - duty cycle conversion means
    - for receiving said input data value, and
    - for producing an excitatory output data signal as a pulse train whose duty cycle is proportional to said input data value; and
  - means for transmitting said excitatory output data signal;
- an excitatory combining element, comprising:
  - means for receiving said excitatory output data signals from said excitatory matrix elements;
  - means for OR'ing said excitatory output data signals to produce a raw excitatory squashed data output signal; and
  - means for transmitting said raw excitatory squashed data output signal;
- a plurality of inhibitory matrix elements, corresponding in number to the number of input vector elements, one being associated with each inhibitory matrix element, each inhibitory matrix element comprising:
  - means for receiving a corresponding input vector element value as an input data value;
  - duty cycle conversion means for receiving said input data value, and for producing an inhibitory output data signal, as a pulse train whose duty cycle is proportional to said input data value; and
  - means for transmitting said inhibitory output data signal;
- an inhibitory combining element, comprising:
  - means for receiving said inhibitory output data signals from said inhibitory matrix elements;
  - means for OR'ing said inhibitory output data signals to produce a raw inhibitory squashed data output signal; and
  - means for transmitting said raw squashed inhibitory data output signal;
- an output processing element, comprising:
  - means for receiving said raw excitatory squashed data output signal;
  - means for receiving said raw inhibitory squashed data output signal; and
  - means for producing, as the network output value, an output data signal which is a function of the time average of the logical AND of said raw excitatory squashed data output signal and the complement of said raw inhibitory squashed data output signal.

* * * * *